United States Patent
Chen et al.

(10) Patent No.: US 11,561,377 B2
(45) Date of Patent: Jan. 24, 2023

(54) OPTICAL IMAGING LENS ASSEMBLY

(71) Applicant: ZHEJIANG SUNNY OPTICAL CO., LTD, Ningbo (CN)

(72) Inventors: Nian Chen, Ningbo (CN); Kaiyuan Zhang, Ningbo (CN); Fujian Dai, Ningbo (CN); Liefeng Zhao, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 322 days.

(21) Appl. No.: 17/031,657

(22) Filed: Sep. 24, 2020

(65) Prior Publication Data

US 2021/0116683 A1  Apr. 22, 2021

(30) Foreign Application Priority Data

Oct. 18, 2019  (CN) .......................... 201910994498.0

(51) Int. Cl.
*G02B 9/60* (2006.01)
*G02B 13/00* (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
USPC .................................. 359/714, 753, 763, 764
See application file for complete search history.

(56) References Cited

U.S. PATENT DOCUMENTS

| | | | |
|---|---|---|---|
| 9,465,196 B2 | 10/2016 | Wang et al. | |
| 9,772,472 B2 | 9/2017 | Huang | |
| 9,798,110 B2 * | 10/2017 | Lee ..................... | G02B 13/0045 |
| 2012/0176687 A1 | 7/2012 | Huang et al. | |

OTHER PUBLICATIONS

Office Action issued in corresponding Indian Application No. 202014040413; dated Dec. 1, 2021; 5 pgs.

* cited by examiner

*Primary Examiner* — William Choi
(74) *Attorney, Agent, or Firm* — Hauptman Ham, LLP

(57) ABSTRACT

The present disclosure discloses an optical imaging lens assembly, which includes: a first lens having positive refractive power and a convex object-side surface; a second lens having refractive power, and a concave image-side surface; a third lens having refractive power; a fourth lens having refractive power; and a fifth lens having negative refractive power, a concave object-side surface, and a concave image-side surface. The optical imaging lens assembly satisfies TL/ImgH<1.35; 0.6<R9/f5<1.2 and 0.5<ET5/ET4<1, where TTL is a total length of the optical imaging lens assembly, ImgH is a half diagonal length of an effective pixel area on an imaging plane, f5 is an effective focal length of the fifth lens, R9 is a radius of curvature of the object-side surface of the fifth lens, ET4 and ET5 are edge thicknesses of the fourth and the fifth lenses, respectively.

20 Claims, 12 Drawing Sheets

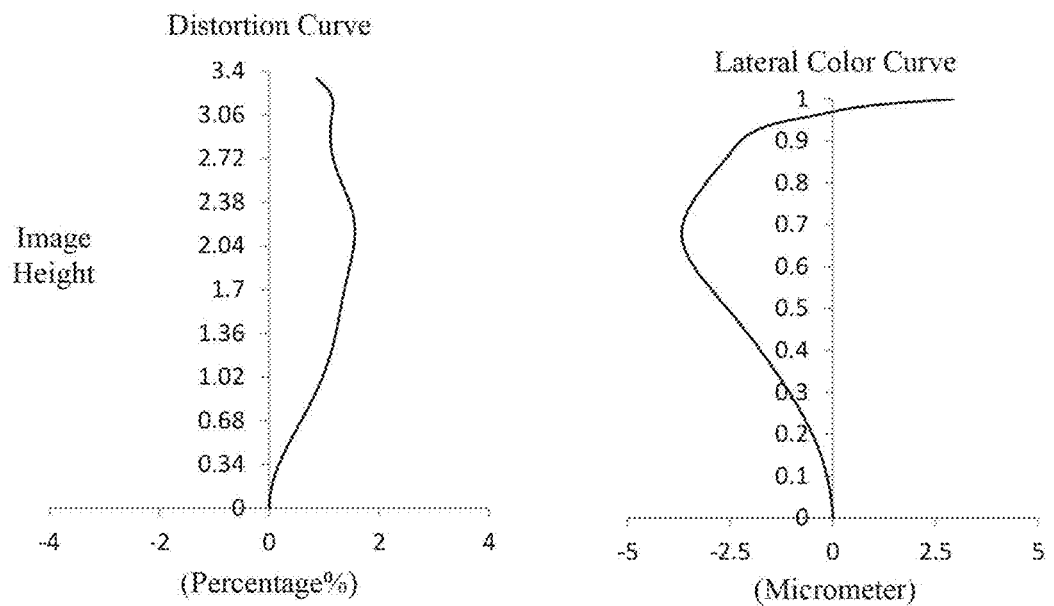
Fig. 6C
Fig. 6D
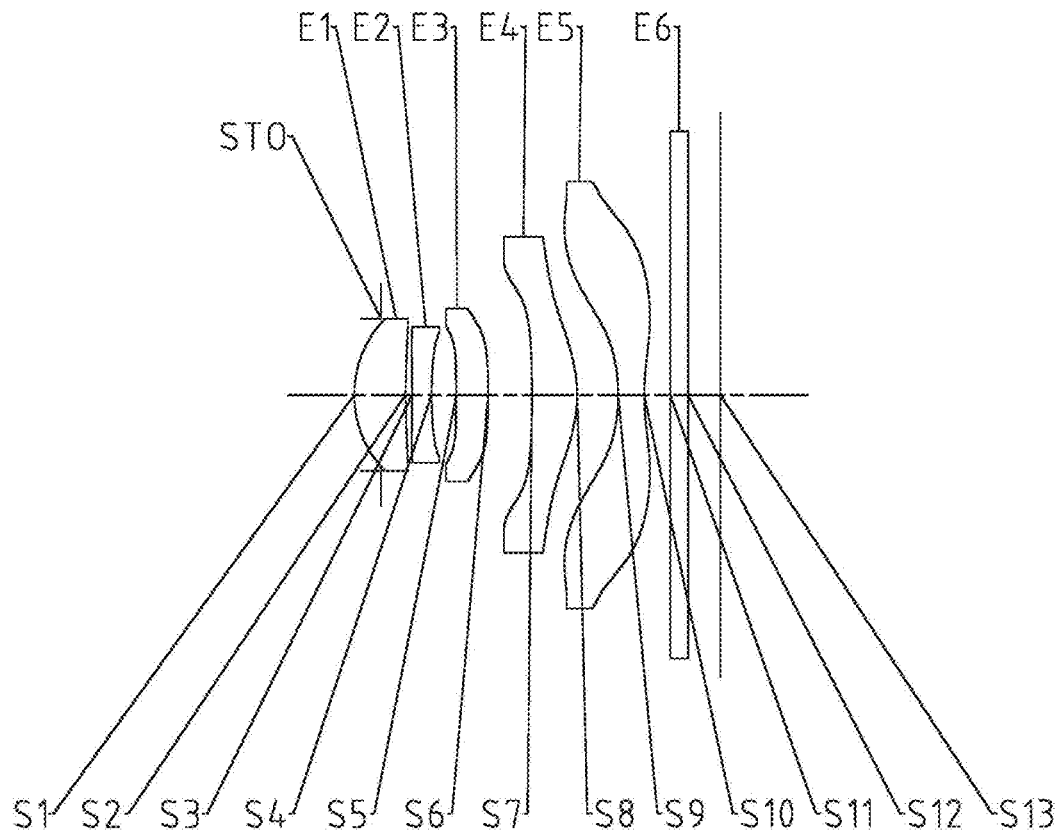
Fig. 7

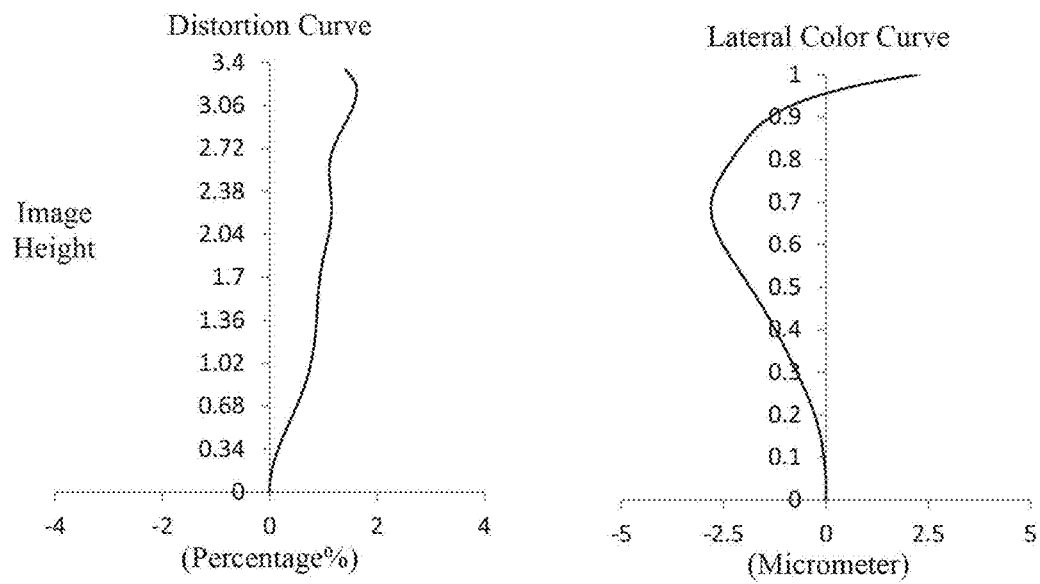
Fig. 10C
Fig. 10D
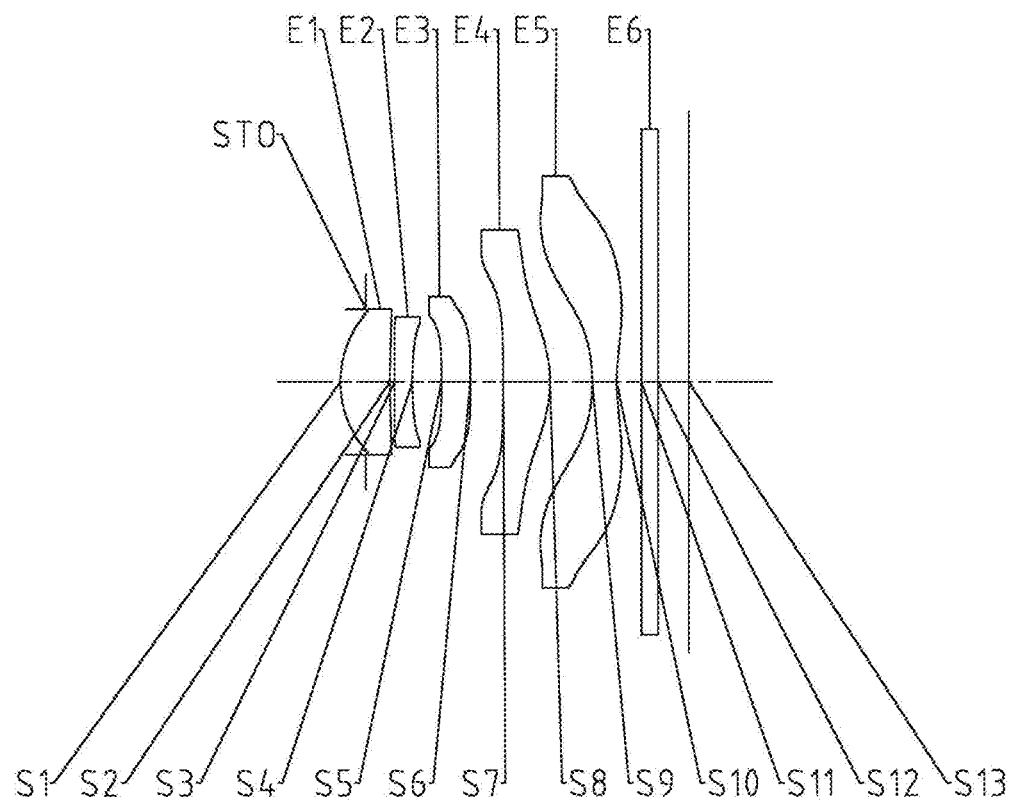
Fig. 11

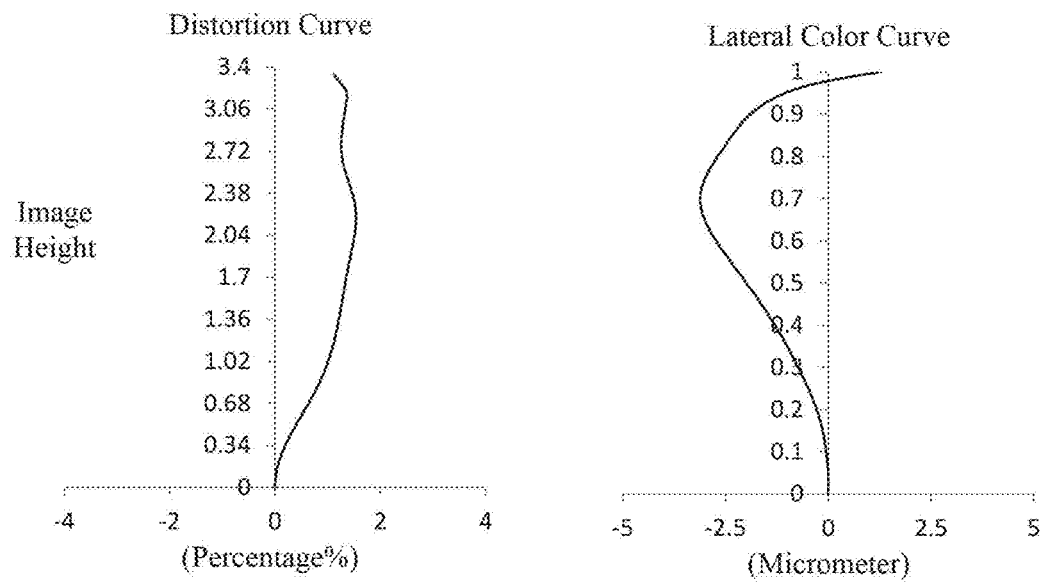
Fig. 14C
Fig. 14D
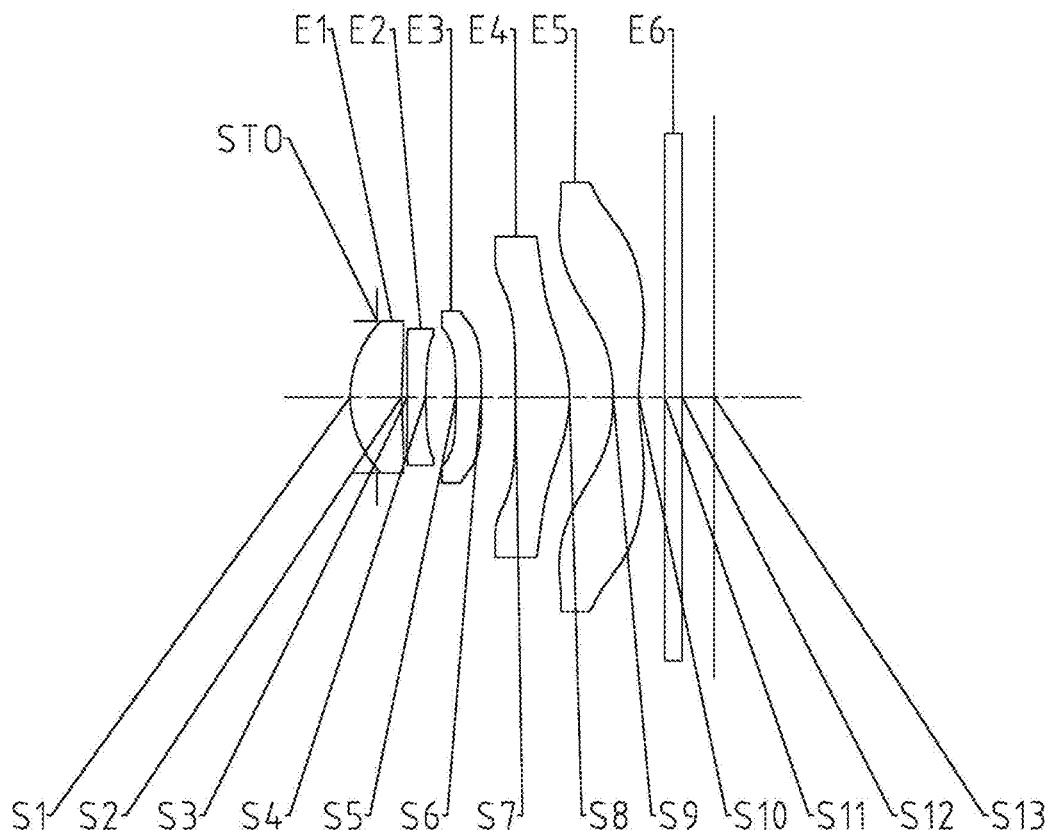
Fig. 15

OPTICAL IMAGING LENS ASSEMBLY

CROSS-REFERENCE TO RELATED APPLICATION

This application claims benefit of priority to Chinese Patent Application No. 201910994498.0 filed on Oct. 18, 2019 before the China National Intellectual Property Administration, the entire disclosure of which is incorporated herein by reference in its entity.

TECHNICAL FIELD

The present disclosure relates to the field of optical elements, and specifically to an optical imaging lens assembly.

BACKGROUND

In recent years, with the rapid development of the portable electronic devices such as smart phones and tablet PCs, and the like, the requirements on the size of camera's front end are increasing while good performances of the portable electronic devices are pursued.

The image height of the existing miniaturized camera is generally small and the front end of the existing miniaturized camera is large. The existing miniaturized camera generally unable to meet the requirements of having a small front end while ensuring a large imaging plane. At present, the full screen has gradually developed into one of the dominant screens of portable electronic devices such as smart phones and tablet PCs and the like in the market. For functional needs, the full screen usually only leaves a small space for the front camera to receive light. Therefore, more stringent requirements are put forward on the size of the front camera's front end. How to reduce the size of the camera's front end while maintaining large imaging plane and good image quality is a development tendency of the lens assembly with a small front end.

SUMMARY

According to an aspect of the present disclosure, an optical imaging lens assembly is provided. The optical imaging lens assembly includes sequentially from an object side to an image side along an optical axis: a first lens having positive refractive power, and an object-side surface thereof is a convex surface; a second lens having refractive power, and an image-side surface thereof is a concave surface; a third lens having refractive power; a fourth lens having refractive power; a fifth lens having negative refractive power, and an object-side surface thereof is a concave surface, an image-side surface thereof is a concave surface. A distance TTL along the optical axis from the object-side surface of the first lens to an imaging plane of the optical imaging lens assembly, and half of a diagonal length ImgH of an effective pixel area on the imaging plane of the optical imaging lens assembly may satisfy TTL/ImgH<1.35.

In one implementation, an effective focal length f5 of the fifth lens and a radius of curvature R9 of the object-side surface of the fifth lens may satisfy 0.6<R9/f5<1.2.

In one implementation, an edge thickness ET4 of the fourth lens and an edge thickness ET5 of the fifth lens may satisfy 0.5<ET5/ET4<1.

In one implementation, a center thickness CT5 along the optical axis of the fifth lens, and a spaced interval T34 along the optical axis between the third lens and the fourth lens may satisfy 0.2<CT5/T34<0.6.

In one implementation, a maximum effective radius DT11 of the object-side surface of the first lens, and a maximum effective radius DT51 of the object-side surface of the fifth lens may satisfy 0.2<DT11/DT51<1.2.

In one implementation, a distance SAG41 along the optical axis from an intersection of an object-side surface of the fourth lens and the optical axis to a vertex an effective radius of the object-side surface of the fourth lens, and a distance SAG42 along the optical axis from an intersection of an image-side surface of the fourth lens and the optical axis to a vertex of an effective radius of the image-side surface of the fourth lens may satisfy 0.5<SAG41/SAG42<1.0.

In one implementation, a distance SAG32 along the optical axis from an intersection of an image-side surface of the third lens and the optical axis to a vertex of an effective radius of the image-side surface of the third lens, and a distance SAG52 along the optical axis from an intersection of the image-side surface of the fifth lens and the optical axis to a vertex of an effective radius of the image-side surface of the fifth lens may satisfy 0.2<SAG32/SAG52<0.6.

In one implementation, a maximum effective radius DT22 of the image-side surface of the second lens and a spaced interval T23 along the optical axis between the second lens and the third lens may satisfy: 0.2<T23/DT22<0.6.

In one implementation, a maximum effective radius DT12 of an image-side surface of the first lens and a maximum effective radius DT31 of an object-side surface of the third lens may satisfy 0.5<DT12/DT31<1.5.

In one implementation, an effective focal length f2 of the second lens, and a combined focal length f45 of the fourth lens and the fifth lens may satisfy 0.2<f2/f45<0.8.

In one implementation, a total effective focal length f of the optical imaging lens assembly, and a combined focal length f123 of the first lens, the second lens and the third lens may satisfy 0.5<f/f123<1.5.

In one implementation, a total effective focal length f of the optical imaging lens assembly and an effective focal length f1 of the first lens may satisfy 0.5<f1/f<1.5.

In one implementation, an effective focal length f4 of the fourth lens and an effective focal length f5 of the fifth lens may satisfy 0.5<f4/(f4-f5)<1.0.

In one implementation, a radius of curvature R1 of the object-side surface of the first lens and a radius of curvature R2 of an image-side surface of the first lens may satisfy 0.3<(R2-R1)/(R2+R1)<1.3.

In one implementation, a radius of curvature R4 of the image-side surface of the second lens and a radius of curvature R8 of an image-side surface of the fourth lens may satisfy −1.0<R8/R4<−0.2.

In one implementation, a radius of curvature R9 of the object-side surface of the fifth lens and a radius of curvature R10 of the image-side surface of the fifth lens may satisfy 0.3<R10/(R10-R9)<1.0.

In one implementation, a center thickness CT1 along the optical axis of the first lens and a center thickness CT3 along the optical axis of the third lens may satisfy 0.3<CT3/CT1<0.8.

In one implementation, a center thickness CT4 along the optical axis of the fourth lens, a spaced interval T34 along the optical axis between the third lens and the fourth lens, and a spaced interval T45 along the optical axis between the fourth lens and the fifth lens may satisfy 0.3<CT4/(T34+T45)<0.8.

The present disclosure employs a plurality of lenses such as five lenses, and the optical imaging lens assembly described above has at least one beneficial effect, such as a small frond end, a large imaging plane, good processability and high image quality, and the like, by properly disposing the refractive power, the surface shape, the center thickness of each lens and the spaced interval along the optical axis between the lenses.

BRIEF DESCRIPTION OF THE DRAWINGS

Other features, purpose and advantages of the present disclosure will become apparent through detailed description of the non-limiting implementations given in conjunction with the accompanying drawings. In the drawings:

FIGS. 6A-6D illustrate a longitudinal aberration curve, an astigmatic curve, a distortion curve and a lateral color curve of the optical imaging lens assembly according to embodiment 3, respectively;

FIG. 7 is a schematic structural view of an optical imaging lens assembly according to embodiment 4 of the present disclosure;

FIGS. 10A-10D illustrate a longitudinal aberration curve, an astigmatic curve, a distortion curve and a lateral color curve of the optical imaging lens assembly according to embodiment 5, respectively;

FIG. 11 is a schematic structural view of an optical imaging lens assembly according to embodiment 6 of the present disclosure;

FIGS. 14A-14D illustrate a longitudinal aberration curve, an astigmatic curve, a distortion curve and a lateral color curve of the optical imaging lens assembly according to embodiment 7, respectively;

FIG. 15 is a schematic structural view of an optical imaging lens assembly according to embodiment 8 of the present disclosure.

DETAILED DESCRIPTION OF EMBODIMENTS

Figure 1:
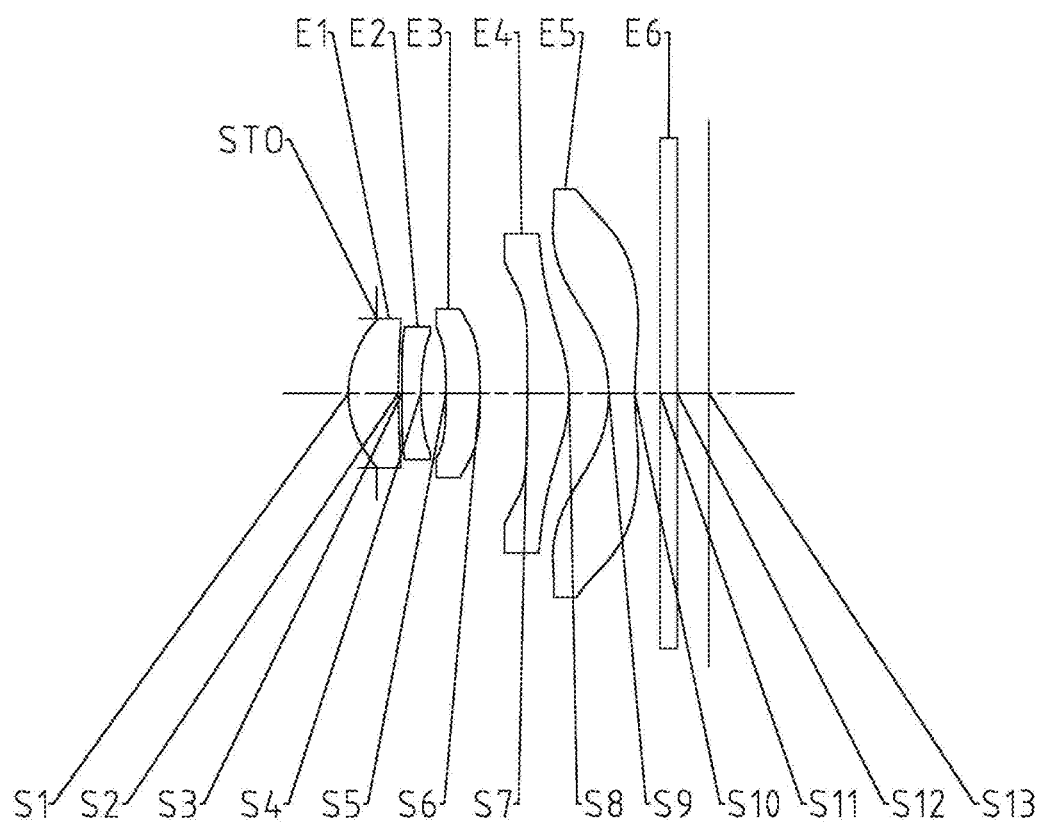
FIG. 1 is a schematic structural view of an optical imaging lens assembly according to embodiment 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without indicating any limitation on the features. Thus, a first lens discussed below could be referred to as a second lens or a third lens without departing from the teachings of the present disclosure.

In the accompanying drawings, for convenience of the description, thicknesses, sizes and shapes of the lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis. If a surface of a lens is a convex surface and the position of the convex is not defined, it indicates that the surface of the lens is convex at least in the paraxial region. If a surface of a lens is a concave surface and the position of the concave is not defined, it indicates that the surface of the lens is concave at least in the paraxial region. The surface of each lens closest to the object side is referred to as an object-side surface, and the surface of each lens closest to the image side is referred to as an image-side surface.

It should be further understood that the terms "comprising," "including," "having", "containing" and/or "contain", when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may", when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

An optical imaging lens assembly according to exemplary implementations of the present disclosure may include five lenses having refractive power, i.e., a first lens, a second lens, a third lens, a fourth lens and a fifth lens. The five lenses are sequentially arranged from an object side to an image side along an optical axis. An air gap may exist between any two adjacent lenses among the first lens to the fifth lens.

In an exemplary implementation, the first lens may have positive refractive power, and an object-side surface thereof may be a convex surface; the second lens has positive or negative refractive power, and an image-side surface thereof may be a concave surface; the third lens has positive or negative refractive power; the fourth lens has positive or negative refractive power; and the fifth lens may have negative refractive power, and an object-side surface thereof may be a concave surface, and an image-side surface thereof may be a concave surface.

The appropriate disposition of the surface shape and refractive power for the first lens to the fifth lens, can not only ensure the compact structure of the optical imaging lens assembly, but also reduce the tolerance sensitivity of the optical imaging lens assembly. Further, it is also beneficial to correct the spherical aberration of the optical imaging lens assembly and compensate the aberration of the optical imaging lens assembly.

In an exemplary implementation, the optical imaging lens assembly of the present disclosure may satisfy TTL/ImgH<1.35, where TTL is a distance along the optical axis from the object-side surface of the first lens to an imaging plane of the optical imaging lens assembly, and ImgH is half of a diagonal length of an effective pixel area on the imaging plane of the optical imaging lens assembly. More specifically, TTL and ImgH may further satisfy TTL/ImgH<1.33. By satisfying TTL/ImgH<1.35, a structure of an optical imaging lens assembly with a large imaging plane and a small front end can be advantageously realized, so that the optical imaging lens assembly is more suitable for a portable electronic device that has strict requirements on the small front end and the large imaging plane.

In an exemplary implementation, the optical imaging lens assembly of the present disclosure may satisfy 0.6<R9/f5<1.2, where f5 is an effective focal length of the fifth lens, and R9 is a radius of curvature of the object-side surface of the fifth lens. More specifically, R9 and f5 may further satisfy 0.7<R9/f5<1.2. By satisfying 0.6<R9/f5<1.2, the deflection of the light at the fifth lens can be effectively restrained, thereby reducing the tolerance sensitivity of the optical imaging lens assembly.

In an exemplary implementation, the optical imaging lens assembly of the present disclosure may satisfy 0.5<ET5/ET4<1, where ET4 is an edge thickness of the fourth lens, and ET5 is an edge thickness of the fifth lens. More specifically, ET5 and ET4 may further satisfy 0.6<ET5/ET4<0.9. Appropriate control of the edge thicknesses of the fourth lens and the fifth lens is beneficial to improving the overall image quality of the lens assembly.

In an exemplary implementation, the optical imaging lens assembly of the present disclosure may satisfy 0.2<CT5/T34<0.6, where CT5 is a center thickness along the optical axis of the fifth lens, and T34 is a spaced interval along the optical axis between the third lens and the fourth lens. More specifically, CT5 and T34 may further satisfy 0.4<CT5/T34<0.6. By satisfying 0.2<CT5/T34<0.6, the on-axis space of the optical imaging lens assembly can be properly configured, so that the structure of the optical imaging lens assembly is more compact.

In an exemplary implementation, the optical imaging lens assembly of the present disclosure may satisfy 0.2<DT11/DT51<1.2, where DT11 is a maximum effective radius of the object-side surface of the first lens, and DT51 is a maximum effective radius of the object-side surface of the fifth lens. More specifically, DT11 and DT51 may further satisfy 0.2<DT11/DT51<0.6. By satisfying 0.2<DT11/DT51<1.2, the optical imaging lens assembly can advantageously realize a large imaging plane while a miniaturized front end is maintained, so that the spatial distribution of the optical imaging lens assembly is more appropriate.

In an exemplary implementation, the optical imaging lens assembly of the present disclosure may satisfy 0.5<SAG41/SAG42<1.0, where SAG41 is a distance along the optical axis from an intersection of an object-side surface of the fourth lens and the optical axis to a vertex of an effective radius of the object-side surface of the fourth lens, and SAG42 is a distance along the optical axis from an intersection of an image-side surface of the fourth lens and the optical axis to a vertex of an effective radius of the image-side surface of the fourth lens. By satisfying 0.5<SAG41/SAG42<1.0, the fourth lens can be advantageously manufactured and molded, and the imaging plane can be enlarged.

In an exemplary implementation, the optical imaging lens assembly of the present disclosure may satisfy 0.2<SAG32/SAG52<0.6, where SAG32 is a distance along the optical axis from an intersection of an image-side surface of the third lens and the optical axis to a vertex of an effective radius of the image-side surface of the third lens, and SAG52 is a distance along the optical axis from an intersection of the image-side surface of the fifth lens and the optical axis to a vertex of an effective radius of the image-side surface of the fifth lens. By satisfying 0.2<SAG32/SAG52<0.6, the bending of the lens is advantageously reduced, thereby reducing the difficulty in manufacturing the lens.

In an exemplary implementation, the optical imaging lens assembly of the present disclosure may satisfy 0.2<T23/DT22<0.6, where DT22 is a maximum effective radius of the image-side surface of the second lens and T23 is a spaced interval along the optical axis between the second lens and the third lens. By satisfying 0.2<T23/DT22<0.6, the distance between the second lens and the third lens is advantageously reduced, so that the structure of the optical imaging lens assembly is more compact.

In an exemplary implementation, the optical imaging lens assembly of the present disclosure may satisfy 0.5<DT12/DT31<1.5, where DT12 is a maximum effective radius of an image-side surface of the first lens, and DT31 is a maximum effective radius of an object-side surface of the third lens. More specifically, DT12 and DT31 may further satisfy 0.8<DT12/DT31<1.2. By satisfying 0.5<DT12/DT31<1.5, a miniaturized front end structure of the optical imaging lens assembly can be advantageously realized, thereby facilitating assembly of the optical imaging lens assembly.

In an exemplary implementation, the optical imaging lens assembly of the present disclosure may satisfy 0.2<f2/f45<0.8, where f2 is an effective focal length of the second lens, and f45 is a combined focal length of the fourth lens and the fifth lens. By satisfying 0.2<f2/f45<0.8, it is possible to share the negative refractive power of the second lens and reduce the tolerance sensitivity of the optical imaging lens assembly.

In an exemplary implementation, the optical imaging lens assembly of the present disclosure may satisfy $0.5<f/f123<1.5$, where f is a total effective focal length of the optical imaging lens assembly, and f123 is a combined focal length of the first lens, the second lens and the third lens. More specifically, f and f123 may further satisfy $0.7<f/f123<1.1$. By satisfying $0.5<f/f123<1.5$, the refractive power of each lens can be properly configured, and the aberration of the optical imaging lens assembly can be reduced.

In an exemplary implementation, the optical imaging lens assembly of the present disclosure may satisfy $0.5<f1/f<1.5$, where f is a total effective focal length of the optical imaging lens assembly, and f1 is an effective focal length of the first lens. More specifically, f1 and f may further satisfy $0.6<f1/f<1.0$. By satisfying $0.5<f1/f<1.5$, light on the object side can be advantageously converged at the first lens, and the aperture of the first lens can be reduced, thereby facilitating miniaturization of the structure of the optical imaging lens assembly.

In an exemplary implementation, the optical imaging lens assembly of the present disclosure may satisfy $0.5<f4/(f4-f5)<1.0$, where f4 is an effective focal length of the fourth lens, and f5 is an effective focal length of the fifth lens. More specifically, f4 and f5 may further satisfy $0.5<f4/(f4-f5)<0.8$. By satisfying $0.5<f4/(f4-f5)<1.0$, the refractive power of the fourth lens and the fifth lens can be properly configured, thereby reducing the aberrations.

In an exemplary implementation, the optical imaging lens assembly of the present disclosure may satisfy $0.3<(R2-R1)/(R2+R1)<1.3$, where R1 is a radius of curvature of the object-side surface of the first lens, and R2 is a radius of curvature of an image-side surface of the first lens. More specifically, R2 and R1 may further satisfy $0.4<(R2-R1)/(R2+R1)<1.0$. By satisfying $0.3<(R2-R1)/(R2+R1)<1.3$, the effective focal length of the first lens can be prevented from being excessively large, and the refractive power of the optical imaging lens assembly is prevented from being excessively concentrated, which is beneficial to the imaging of the optical imaging lens.

In an exemplary implementation, the optical imaging lens assembly of the present disclosure may satisfy $-1.0<R8/R4<-0.2$, where R4 is a radius of curvature of the image-side surface of the second lens, and R8 is a radius of curvature of an image-side surface of the fourth lens. More specifically, R8 and R4 may further satisfy $-0.7<R8/R4<-0.2$. By satisfying $-1.0<R8/R4<-0.2$, the aberration contributions of the second lens and the fourth lens to the optical imaging lens assembly is advantageously adjusted.

In an exemplary implementation, the optical imaging lens assembly of the present disclosure may satisfy $0.3<R10/(R10-R9)<1.0$, where R9 is a radius of curvature of the object-side surface of the fifth lens, and R10 is a radius of curvature of the image-side surface of the fifth lens. More specifically, R10 and R9 may further satisfy $0.4<R10/(R10-R9)<0.8$. By satisfying $0.3<R10/(R10-R9)<1.0$, the aberration contribution of the fifth lens to the optical imaging lens assembly is advantageously adjusted.

In an exemplary implementation, the optical imaging lens assembly of the present disclosure may satisfy $0.3<CT3/CT1<0.8$, where CT1 is a center thickness along the optical axis of the first lens, and CT3 is a center thickness along the optical axis of the third lens. By satisfying $0.3<CT3/CT1<0.8$, both the manufacturing and molding of the lens and the reduction of the thickness of the optical imaging lens assembly's front end can be facilitated.

In an exemplary implementation, the optical imaging lens assembly of the present disclosure may satisfy $0.3<CT4/(T34+T45)<0.8$, where CT4 is a center thickness along the optical axis of the fourth lens, T34 is a spaced interval along the optical axis between the third lens and the fourth lens, and T45 is a spaced interval along the optical axis between the fourth lens and the fifth lens. By satisfying $0.3<CT4/(T34+T45)<0.8$, the influence of the excessive thickness of the lens on the spatial distribution of the lens assembly can be avoided, thereby facilitating the assembly of the optical imaging lens assembly.

In an exemplary implementation, the optical imaging lens assembly of the present disclosure may further include a stop disposed between the object side and the first lens. Alternatively, the optical imaging lens assembly described above may further include an optical filter to correct chromatic aberration and/or a protective glass for protecting a photosensitive element on the imaging plane.

The optical imaging lens assembly according to the above implementations of the present disclosure may employ a plurality of lenses, such as five lenses as described above. By properly configuring the refractive power, the surface shape, the center thickness of each lens, and spaced intervals along the optical axis between the lenses, the incident light can be effectively converged, the total length of the optical imaging lens assembly can be reduced, and the processability of the optical imaging lens assembly can be improved, so that the structure of the lens assembly can be more compact. The optical imaging lens assembly described above is more conducive to production and processing, and has higher practicability. With the above configurations, the optical imaging lens assembly according to the exemplary implementations of the present disclosure may have characteristics, such as a large imaging plane, a small front end, and the like, which can meet the needs of the highly integrated electronic device for the camera with small front end.

In the implementations of the present disclosure, at least one of the surfaces of each lens is aspheric, i.e., at least one of the object-side surface of the first lens to the image-side surface of the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better radius of curvature characteristic, and has the advantages of improving distortion aberration and improving astigmatic aberration. By using an aspheric lens, the aberrations that occur during imaging can be eliminated as much as possible, and thus improving imaging quality. Alternatively, at least one of the object-side surface and the image-side surface of each of the first lens, the second lens, the third lens, the fourth lens, the fifth lens is aspheric. Alternatively, both of the object-side surface and the image-side surface of each of the first lens, the second lens, the third lens, the fourth lens, the fifth lens are aspheric.

However, it will be understood by those skilled in the art that the number of lenses constituting the optical imaging lens assembly can be varied to achieve the various results and advantages described in this specification without departing from the technical solution claimed by the present disclosure. For example, although the implementation are described by taking five lenses as an example, the optical imaging lens assembly is not limited to including five lenses. The optical imaging lens assembly can also include other numbers of lenses if desired.

Specific embodiments applicable to the optical imaging lens assembly of the above implementations will be further described below with reference to the accompanying drawings.

Embodiment 1

An optical imaging lens assembly according to embodiment 1 of the present disclosure is described below with reference to FIG. 1 to FIG. 2D. FIG. 1 is a schematic structural view of an optical imaging lens assembly according to embodiment 1 of the present disclosure.

As shown in FIG. 1, the optical imaging lens assembly includes, sequentially from an object side to an image side along an optical axis: a stop STO, a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

Table 1 is a table illustrating the basic parameters of the optical imaging lens assembly in embodiment 1, wherein the units for radius of curvature, thickness/distance, and focal length are millimeter (mm).

In this embodiment, a total effective focal length f of the optical imaging lens assembly is 3.81 mm, a total length TTL of the optical imaging lens assembly (i.e., a distance along the optical axis from the object-side surface S1 of the first lens E1 to the imaging plane S13 of the optical imaging lens assembly) is 4.37 mm, half of a diagonal length ImgH of an effective pixel area on the imaging plane S13 is 3.34 mm, half of a maximal field-of-view angle Semi-FOV of the optical imaging lens assembly is 40.6°, and the ratio f/EPD of the total effective focal length f of the optical imaging lens assembly with respect to an entrance pupil diameter EPD of the optical imaging lens assembly is 2.09.

In embedment 1, the object-side surface and the image-side surface of any one of the first lens E1 to the fifth lens E5 are aspheric, and the surface shape x of each aspheric lens can be defined by using, but not limited to, the following aspheric formula:

$$x = \frac{ch^2}{1 + \sqrt{1-(k+1)c^2h^2}} + \sum Aih^i \quad (1)$$

Here, x is the sag—the axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the radius of curvature R in the above Table 1); k is the conic coefficient; Ai is a correction coefficient for the i-th order of the aspheric surface. Table 2 below shows high-order coefficients A4, A6, A8, A10, A12, A14, A16, A18 and A20 applicable to each aspheric surface S1-S10 in embodiment 1.

TABLE 1

| Surface number | Surface type | Radius of curvature | Thickness/ distance | Material Refractive index | Material Abbe number | Focal length | Conic coefficient |
|---|---|---|---|---|---|---|---|
| OBJ | spherical | infinite | 370.000 | | | | |
| STO | spherical | infinite | −0.3449 | | | | |
| S1 | aspheric | 1.3607 | 0.6069 | 1.55 | 56.1 | 2.79 | 0.0000 |
| S2 | aspheric | 10.6122 | 0.0427 | | | | 0.0000 |
| S3 | aspheric | 24.9659 | 0.2300 | 1.67 | 20.4 | −5.34 | 0.0000 |
| S4 | aspheric | 3.0998 | 0.3047 | | | | 0.0000 |
| S5 | aspheric | −13.7144 | 0.4131 | 1.55 | 56.1 | 24.17 | 0.0000 |
| S6 | aspheric | −6.7966 | 0.5753 | | | | 0.0000 |
| S7 | aspheric | −391.8758 | 0.5046 | 1.55 | 56.1 | 3.24 | 0.0000 |
| S8 | aspheric | −1.7618 | 0.4803 | | | | −1.0000 |
| S9 | aspheric | −1.7438 | 0.3150 | 1.54 | 55.9 | −2.11 | −1.0000 |
| S10 | aspheric | 3.4469 | 0.3064 | | | | 0.0000 |
| S11 | spherical | infinite | 0.2100 | 1.52 | 64.2 | | |
| S12 | spherical | infinite | 0.3811 | | | | |
| S13 | spherical | infinite | | | | | |

TABLE 2

| Surface number | A4 | A6 | A8 | A10 | A12 |
|---|---|---|---|---|---|
| S1 | −8.9239E−03 | 1.4954E−01 | −9.0814E−01 | 3.5835E+00 | −9.1339E+00 |
| S2 | −1.0170E−01 | 5.5378E−02 | 2.2759E+00 | −1.3802E+01 | 4.4920E+01 |
| S3 | −1.1192E−01 | 3.8008E−01 | 6.4146E−01 | −6.1677E+00 | 1.9241E+01 |
| S4 | −2.9535E−03 | 1.7142E−01 | 8.0509E−01 | −5.2805E+00 | 1.3517E+01 |
| S5 | −1.9094E−01 | −1.2667E−01 | 7.5841E−01 | −4.2307E+00 | 1.3842E+01 |
| S6 | −1.6198E−01 | 1.7203E−01 | −1.5288E+00 | 6.4486E+00 | −1.6515E+01 |
| S7 | 9.0155E−03 | −8.3306E−02 | 1.4715E−01 | −2.2374E−01 | 2.1624E−01 |
| S8 | 1.2020E−01 | −1.1915E−01 | 1.4730E−01 | −1.1032E−01 | 5.1104E−02 |
| S9 | −5.5720E−02 | −4.2120E−04 | 5.2550E−02 | −3.0328E−02 | 7.5728E−03 |
| S10 | −1.8252E−01 | 1.2007E−01 | −6.8410E−02 | 2.9435E−02 | −9.1599E−03 |

| Surface number | A14 | A16 | A18 | A20 |
|---|---|---|---|---|
| S1 | 1.4988E+01 | −1.5327E+01 | 8.9020E+00 | −2.2551E+00 |
| S2 | −8.9824E+01 | 1.0948E+02 | −7.4604E+01 | 2.1629E+01 |
| S3 | −3.2965E+01 | 3.2057E+01 | −1.5885E+01 | 2.6263E+00 |
| S4 | −1.1847E+01 | −1.2758E+01 | 3.4391E+01 | −1.9897E+01 |
| S5 | −2.9536E+01 | 4.0247E+01 | −3.2340E+01 | 1.2317E+01 |
| S6 | 2.6207E+01 | −2.5111E+01 | 1.3328E+01 | −2.9917E+00 |
| S7 | −1.3539E−01 | 5.2614E−02 | −1.1200E−02 | 9.8210E−04 |
| S8 | −1.5302E−02 | 2.9253E−03 | −3.2552E−04 | 1.5953E−05 |
| S9 | −8.1434E−04 | −8.5393E−06 | 9.5621E−06 | −6.0455E−07 |
| S10 | 1.9456E−03 | −2.6675E−04 | 2.1370E−05 | −7.5903E−07 |

Figure 2A:
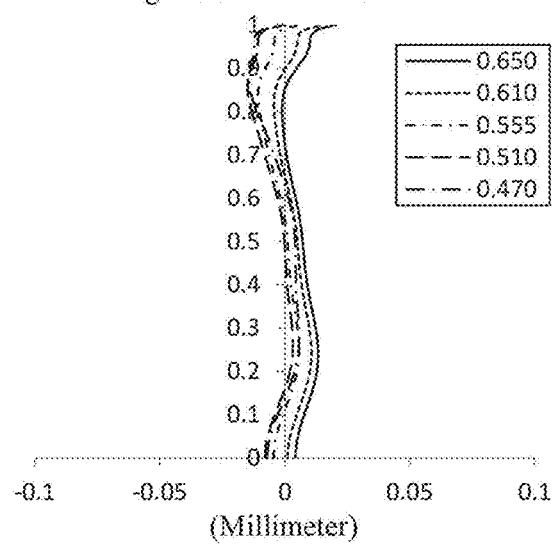
FIGS. 2A-2D illustrate a longitudinal aberration curve, an astigmatic curve, a distortion curve and a lateral color curve of the optical imaging lens assembly according to embodiment 1, respectively.
Figure 2B:
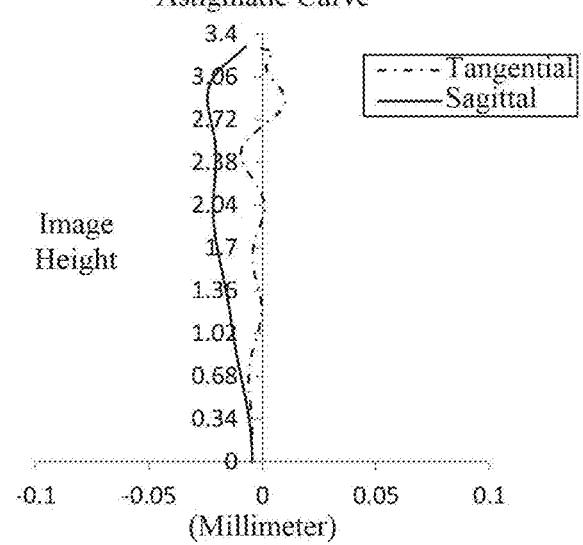
Figures 2C, 2D:
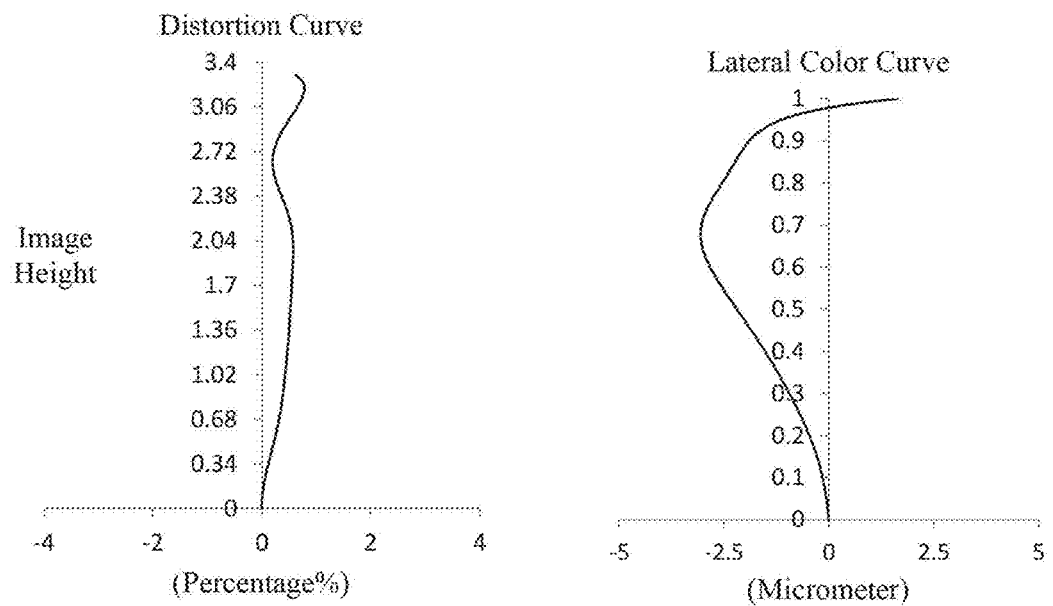

FIG. 2A illustrates a longitudinal aberration curve of the optical imaging lens assembly according to embodiment 1, representing deviations of focal points converged by light of different wavelengths after passing through the optical imaging lens assembly. FIG. 2B illustrates an astigmatic curve of the optical imaging lens assembly according to embodiment 1, representing a curvature of a tangential plane and a curvature of a sagittal plane. FIG. 2C illustrates a distortion curve of the optical imaging lens assembly according to embodiment 1, representing amounts of distortion at different image heights. FIG. 2D illustrates a lateral color curve of the optical imaging lens assembly according to embodiment 1, representing deviations at different image heights on an imaging plane after light passes through the optical imaging lens assembly. It can be seen from FIG. 2A to FIG. 2D that the optical imaging lens assembly provided in embodiment 1 can achieve good image quality.

Embodiment 2

Figure 3:
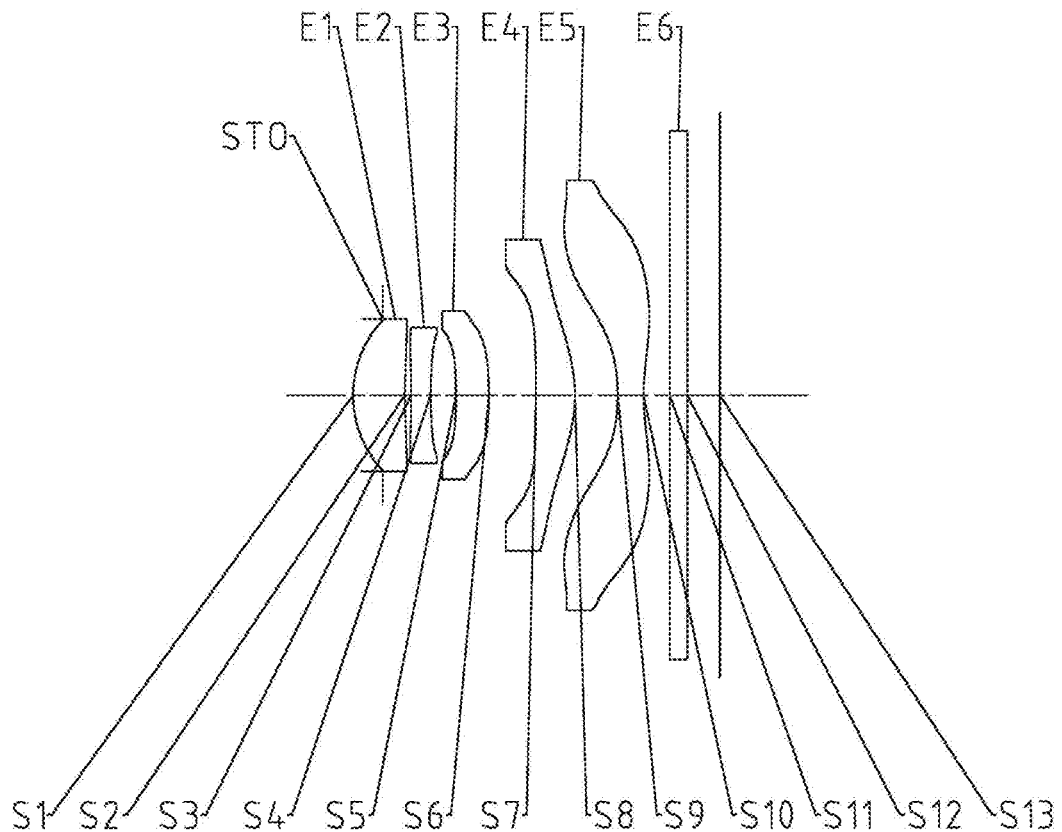
FIG. 3 is a schematic structural view of an optical imaging lens assembly according to embodiment 2 of the present disclosure.

An optical imaging lens assembly according to embodiment 2 of the present disclosure is described below with reference to FIG. 3 to FIG. 4D. In this embodiment and the following embodiments, for the purpose of brevity, the description of parts similar to those in embodiment 1 will be omitted. FIG. 3 is a schematic structural view of the optical imaging lens assembly according to embodiment 2 of the present disclosure.

As shown in FIG. 3, the optical imaging lens assembly includes, sequentially from an object side to an image side along an optical axis: a stop STO, a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

In this embodiment, a total effective focal length f of the optical imaging lens assembly is 3.81 mm, a total length TTL of the optical imaging lens assembly is 4.36 mm, half of a diagonal length ImgH of an effective pixel area on the imaging plane S13 is 3.38 mm, half of a maximal field-of-view angle Semi-FOV of the optical imaging lens assembly is 40.8°, and the ratio f/EPD of the total effective focal length f of the optical imaging lens assembly with respect to an entrance pupil diameter EPD of the optical imaging lens assembly is 2.09.

Table 3 is a table illustrating the basic parameters of the optical imaging lens assembly in embodiment 2, wherein the units for radius of curvature, thickness/distance, and focal length are millimeter (mm). Table 4 below shows high-order coefficients applicable to each aspheric surface in embodiment 2, wherein the surface type of each aspheric surface may be defined by the formula (1) given above in embodiment 1.

TABLE 3

| Surface number | Surface type | Radius of curvature | Thickness/ distance | Material Refractive index | Abbe number | Focal length | Conic coefficient |
|---|---|---|---|---|---|---|---|
| OBJ | spherical | infinite | 370.000 | | | | |
| STO | spherical | infinite | −0.3521 | | | | |
| S1 | aspheric | 1.3423 | 0.6136 | 1.55 | 56.1 | 3.03 | 0.0000 |
| S2 | aspheric | 6.0014 | 0.0774 | | | | 0.0000 |
| S3 | aspheric | −22.0000 | 0.2300 | 1.67 | 20.4 | −7.26 | 0.0000 |
| S4 | aspheric | 6.2206 | 0.3025 | | | | 0.0000 |
| S5 | aspheric | −8.6918 | 0.3905 | 1.55 | 56.1 | 33.02 | 0.0000 |
| S6 | aspheric | −5.9576 | 0.5587 | | | | 0.0000 |
| S7 | aspheric | −25.1797 | 0.4651 | 1.55 | 56.1 | 3.48 | 0.0000 |
| S8 | aspheric | −1.7761 | 0.5078 | | | | −2.1004 |
| S9 | aspheric | −2.4363 | 0.3060 | 1.54 | 55.9 | −2.19 | 0.0000 |
| S10 | aspheric | 2.3746 | 0.3120 | | | | −1.0000 |
| S11 | spherical | infinite | 0.2100 | 1.52 | 64.2 | | |
| S12 | spherical | infinite | 0.3864 | | | | |
| S13 | spherical | infinite | | | | | |

TABLE 4

| Surface number | A4 | A6 | A8 | A10 | A12 |
|---|---|---|---|---|---|
| S1 | −1.9225E−03 | 9.6100E−02 | −6.5147E−01 | 2.9133E+00 | −8.1496E+00 |
| S2 | −1.0111E−01 | 2.8899E−02 | 5.7360E−01 | −2.9720E+00 | 8.5110E+00 |
| S3 | −1.0687E−01 | 3.5211E−01 | −7.7509E−01 | 4.3468E+00 | −1.8981E+01 |
| S4 | −1.0104E−02 | 2.4482E−01 | 1.9775E−01 | −1.6052E+00 | 3.0935E+00 |
| S5 | −2.3900E−01 | −2.0075E−01 | 2.2185E+00 | −1.8528E+01 | 8.6986E+01 |
| S6 | −1.7926E−01 | −4.2870E−02 | −2.4032E−01 | 1.6511E+00 | −5.5808E+00 |
| S7 | 1.4255E−02 | −7.7922E−02 | 7.3126E−03 | 1.0620E−01 | −1.8695E−01 |
| S8 | 1.0623E−01 | −1.2868E−01 | 1.1230E−01 | −3.9647E−02 | −3.0414E−03 |
| S9 | −1.1070E−01 | −1.3466E−02 | 1.1710E−01 | −8.3871E−02 | 3.1013E−02 |
| S10 | −2.4665E−01 | 1.6521E−01 | −8.8878E−02 | 3.5916E−02 | −1.0477E−02 |

| Surface number | A14 | A16 | A18 | A20 |
|---|---|---|---|---|
| S1 | 1.4283E+01 | −1.5251E+01 | 9.0501E+00 | −2.3073E+00 |
| S2 | −1.4841E+01 | 1.4539E+01 | −6.6946E+00 | 7.9843E−01 |
| S3 | 4.8636E+01 | −7.2094E+01 | 5.7879E+01 | −1.9456E+01 |
| S4 | −7.3927E−01 | −5.2952E+00 | 6.8315E+00 | −1.7226E+00 |
| S5 | −2.4821E+02 | 4.2081E+02 | −3.9126E+02 | 1.5407E+02 |
| S6 | 1.0609E+01 | −1.1513E+01 | 6.6088E+00 | −1.5145E+00 |
| S7 | 1.5727E−01 | −7.3109E−02 | 1.8058E−02 | −1.8381E−03 |
| S8 | 6.5632E−03 | −1.9826E−03 | 2.4718E−04 | −1.0545E−05 |
| S9 | −6.9438E−03 | 9.5519E−04 | −7.4806E−05 | 2.5696E−06 |
| S10 | 2.0875E−03 | −2.6761E−04 | 1.9929E−05 | −6.5536E−07 |

Figure 4A:
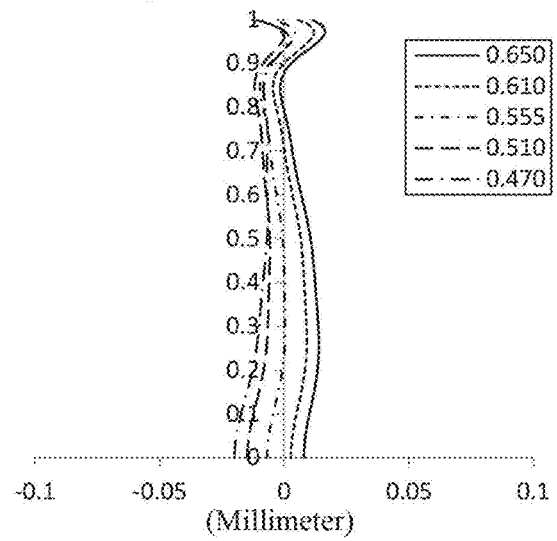
FIGS. 4A-4D illustrate a longitudinal aberration curve, an astigmatic curve, a distortion curve and a lateral color curve of the optical imaging lens assembly according to embodiment 2, respectively.
Figure 4B:
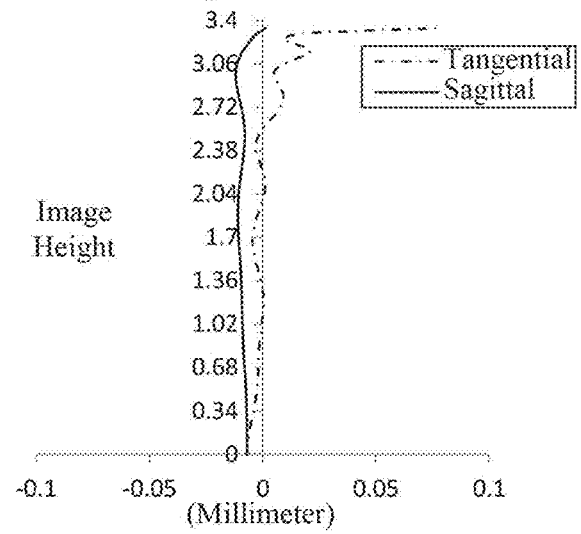
Figure 4C:
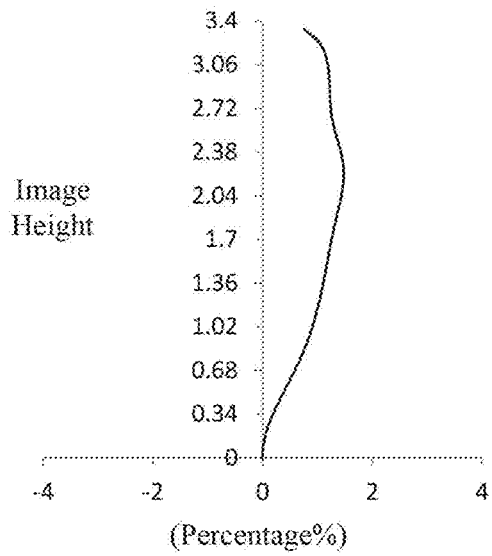
Figure 4D:
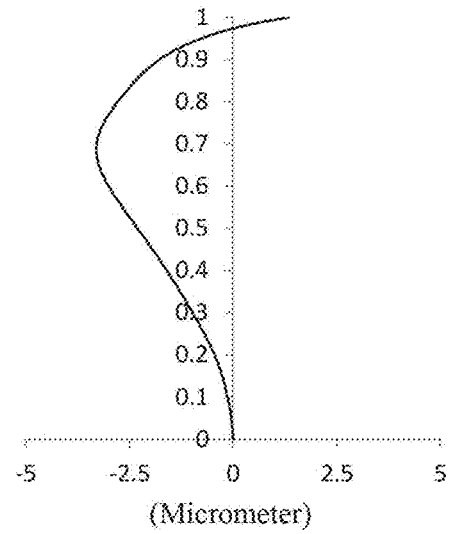

FIG. 4A illustrates a longitudinal aberration curve of the optical imaging lens assembly according to embodiment 2, representing deviations of focal points converged by light of different wavelengths after passing through the optical imaging lens assembly. FIG. 4B illustrates an astigmatic curve of the optical imaging lens assembly according to embodiment 2, representing a curvature of a tangential plane and a curvature of a sagittal plane. FIG. 4C illustrates a distortion curve of the optical imaging lens assembly according to embodiment 2, representing amounts of distortion at different image heights. FIG. 4D illustrates a lateral color curve of the optical imaging lens assembly according to embodiment 2, representing deviations at different image heights on an imaging plane after light passes through the optical imaging lens assembly. It can be seen from FIG. 4A to FIG. 4D that the optical imaging lens assembly provided in embodiment 2 can achieve good image quality.

Embodiment 3

Figure 5:
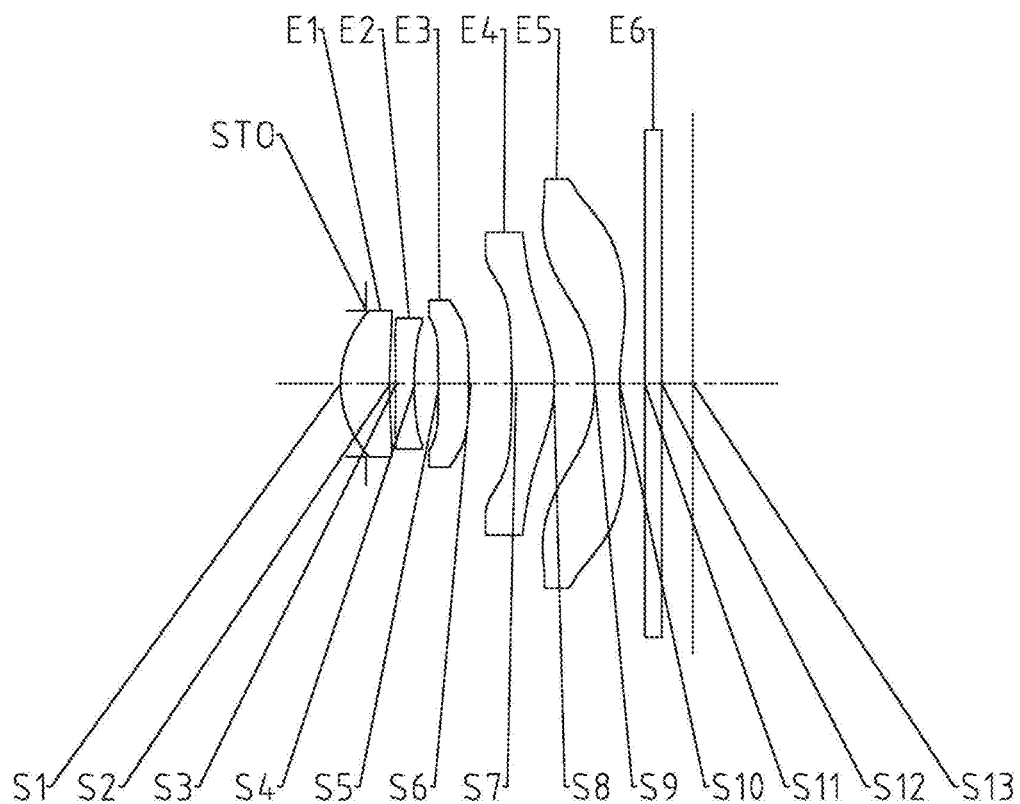
FIG. 5 is a schematic structural view of an optical imaging lens assembly according to embodiment 3 of the present disclosure.

An optical imaging lens assembly according to embodiment 3 of the present disclosure is described below with reference to FIG. 5 to FIG. 6D. FIG. 5 is a schematic structural view of the optical imaging lens assembly according to embodiment 3 of the present disclosure.

As shown in FIG. 5, the optical imaging lens assembly includes, sequentially from an object side to an image side along an optical axis: a stop STO, a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

In this embodiment, a total effective focal length f of the optical imaging lens assembly is 3.81 mm, a total length TTL of the optical imaging lens assembly is 4.36 mm, half of a diagonal length ImgH of an effective pixel area on the imaging plane S13 is 3.38 mm, half of a maximal field-of-view angle Semi-FOV of the optical imaging lens assembly is 40.9°, and the ratio f/EPD of the total effective focal length f of the optical imaging lens assembly with respect to an entrance pupil diameter EPD of the optical imaging lens assembly is 2.09.

Table 5 is a table illustrating the basic parameters of the optical imaging lens assembly in embodiment 3, wherein the units for radius of curvature, thickness/distance, and focal length are millimeter (mm). Table 6 below shows high-order coefficients applicable to each aspheric surface in embodiment 3, wherein the surface type of each aspheric surface may be defined by the formula (1) given above in embodiment 1.

TABLE 5

| Surface number | Surface type | Radius of curvature | Thickness/ distance | Material Refractive index | Material Abbe number | Focal length | Conic coefficient |
|---|---|---|---|---|---|---|---|
| OBJ | spherical | infinite | 370.000 | | | | |
| STO | spherical | infinite | −0.3163 | | | | |
| S1 | aspheric | 1.3484 | 0.6048 | 1.55 | 56.1 | 3.09 | 0.0000 |
| S2 | aspheric | 5.6575 | 0.0764 | | | | 0.0000 |
| S3 | aspheric | 173.5061 | 0.2300 | 1.67 | 20.4 | −6.65 | 0.0000 |
| S4 | aspheric | 4.3119 | 0.2980 | | | | 0.0000 |
| S5 | aspheric | 25.6000 | 0.3774 | 1.55 | 56.1 | 22.79 | 0.0000 |
| S6 | aspheric | −24.0714 | 0.5322 | | | | 0.0000 |
| S7 | aspheric | −17.5436 | 0.5272 | 1.55 | 56.1 | 3.38 | 0.0000 |
| S8 | aspheric | −1.6861 | 0.4982 | | | | −1.8940 |
| S9 | aspheric | −2.4231 | 0.3077 | 1.54 | 55.9 | −2.21 | 0.0000 |
| S10 | aspheric | 2.4302 | 0.3118 | | | | −1.0000 |
| S11 | spherical | infinite | 0.2100 | 1.52 | 64.2 | | |
| S12 | spherical | infinite | 0.3862 | | | | |
| S13 | spherical | infinite | | | | | |

TABLE 6

| Surface number | A4 | A6 | A8 | A10 | A12 |
|---|---|---|---|---|---|
| S1 | 3.5277E−04 | 4.0251E−02 | −2.8176E−01 | 1.3950E+00 | −4.2787E+00 |
| S2 | −1.2946E−01 | 7.8419E−02 | 8.8623E−01 | −5.5905E+00 | 1.9089E+01 |
| S3 | −1.5884E−01 | 3.6276E−01 | 2.4753E−01 | −1.6648E+00 | 7.9149E−02 |
| S4 | −5.9769E−02 | 5.0301E−01 | −1.9084E+00 | 1.2482E+01 | −5.5298E+01 |
| S5 | −2.3099E−01 | 4.0594E−02 | 7.1942E−03 | −2.7095E+00 | 1.6866E+01 |
| S6 | −1.6896E−01 | 2.9641E−02 | −4.6758E−01 | 1.8642E+00 | −4.6883E+00 |
| S7 | 1.3048E−02 | −1.0652E−01 | 1.6430E−01 | −2.1970E−01 | 2.0778E−01 |
| S8 | 9.5468E−02 | −1.2468E−01 | 1.1770E−01 | −2.7769E−02 | −2.4893E−02 |
| S9 | −1.0204E−01 | −2.6643E−02 | 1.2390E−01 | −8.4142E−02 | 2.9892E−02 |
| S10 | −2.3592E−01 | 1.5524E−01 | −8.4021E−02 | 3.4757E−02 | −1.0474E−02 |

| Surface number | A14 | A16 | A18 | A20 |
|---|---|---|---|---|
| S1 | 8.0953E+00 | −9.2453E+00 | 5.8308E+00 | −1.5733E+00 |
| S2 | −3.9758E+01 | 4.8932E+01 | −3.2461E+01 | 8.8553E+00 |
| S3 | 1.2187E+01 | −3.0826E+01 | 3.2599E+01 | −1.3131E+01 |
| S4 | 1.4760E+02 | −2.3130E+02 | 1.9699E+02 | −7.0045E+01 |
| S5 | −5.3646E+01 | 9.4417E+01 | −8.8015E+01 | 3.4224E+01 |
| S6 | 7.3094E+00 | −6.8331E+00 | 3.4817E+00 | −7.1961E−01 |
| S7 | −1.4012E−01 | 6.0861E−02 | −1.4368E−02 | 1.3741E−03 |
| S8 | 2.0312E−02 | −6.3052E−03 | 9.3690E−04 | −5.5208E−05 |
| S9 | −6.4433E−03 | 8.5562E−04 | −6.5028E−05 | 2.1851E−06 |
| S10 | 2.1648E−03 | −2.8871E−04 | 2.2387E−05 | −7.6493E−07 |

Figures 6A, 6B:
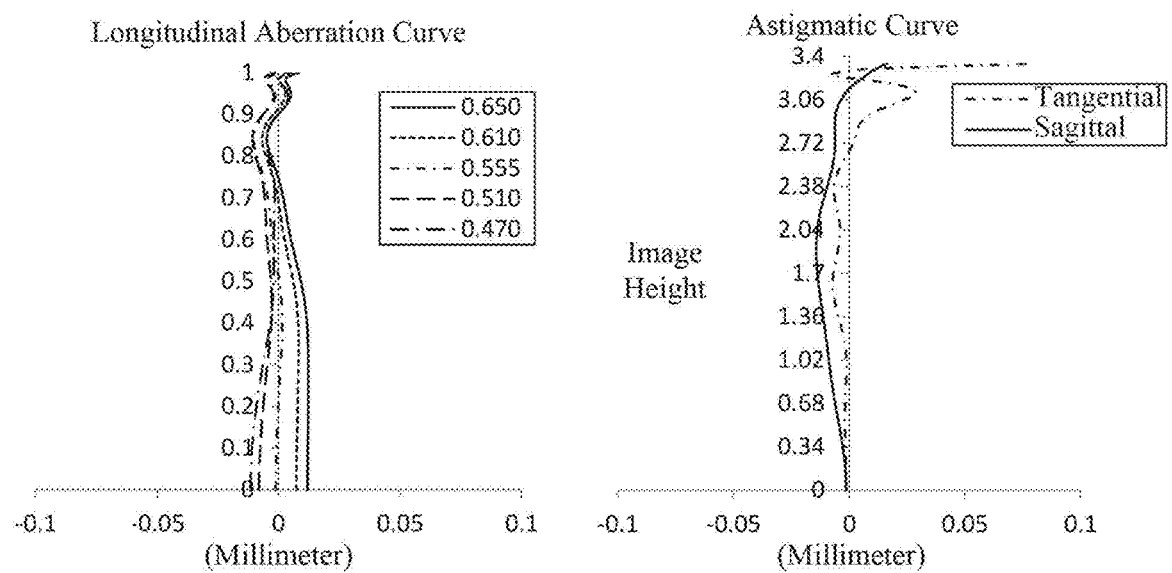

FIG. 6A illustrates a longitudinal aberration curve of the optical imaging lens assembly according to embodiment 3, representing deviations of focal points converged by light of different wavelengths after passing through the optical imaging lens assembly. FIG. 6B illustrates an astigmatic curve of the optical imaging lens assembly according to embodiment 3, representing a curvature of a tangential plane and a curvature of a sagittal plane. FIG. 6C illustrates a distortion curve of the optical imaging lens assembly according to embodiment 3, representing amounts of distortion at different image heights. FIG. 6D illustrates a lateral color curve of the optical imaging lens assembly according to embodiment 3, representing deviations at different image heights on an imaging plane after light passes through the optical imaging lens assembly. It can be seen from FIG. 6A to FIG. 6D that the optical imaging lens assembly provided in embodiment 3 can achieve good image quality.

Embodiment 4

An optical imaging lens assembly according to embodiment 4 of the present disclosure is described below with reference to FIG. 7 to FIG. 8D. FIG. 7 is a schematic structural view of the optical imaging lens assembly according to embodiment 4 of the present disclosure.

As shown in FIG. 7, the optical imaging lens assembly includes, sequentially from an object side to an image side along an optical axis: a stop STO, a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

In this embodiment, a total effective focal length f of the optical imaging lens assembly is 3.81 mm, a total length TTL of the optical imaging lens assembly is 4.36 mm, half of a diagonal length ImgH of an effective pixel area on the imaging plane S13 is 3.38 mm, half of a maximal field-of-view angle Semi-FOV of the optical imaging lens assembly is 40.9°, and the ratio f/EPD of the total effective focal length f of the optical imaging lens assembly with respect to an entrance pupil diameter EPD of the optical imaging lens assembly is 2.09.

Table 7 is a table illustrating the basic parameters of the optical imaging lens assembly in embodiment 4, wherein the units for radius of curvature, thickness/distance, and focal length are millimeter (mm). Table 8 below shows high-order coefficients applicable to each aspheric surface in embodiment 4, wherein the surface type of each aspheric surface may be defined by the formula (1) given above in embodiment 1.

TABLE 7

| Surface number | Surface type | Radius of curvature | Thickness/ distance | Material Refractive index | Abbe number | Focal length | Conic coefficient |
|---|---|---|---|---|---|---|---|
| OBJ | spherical | infinite | 370.000 | | | | |
| STO | spherical | infinite | −0.3193 | | | | |
| S1 | aspheric | 1.3392 | 0.6094 | 1.55 | 56.1 | 3.06 | 0.0000 |
| S2 | aspheric | 5.6789 | 0.0811 | | | | 0.0000 |
| S3 | aspheric | −50.0000 | 0.2300 | 1.67 | 20.4 | −6.81 | 0.0000 |
| S4 | aspheric | 4.9917 | 0.2954 | | | | 0.0000 |
| S5 | aspheric | 72.6000 | 0.3782 | 1.55 | 56.1 | 24.93 | 0.0000 |
| S6 | aspheric | −16.7209 | 0.5229 | | | | 0.0000 |
| S7 | aspheric | −14.7391 | 0.5377 | 1.55 | 56.1 | 3.37 | 0.0000 |
| S8 | aspheric | −1.6588 | 0.4875 | | | | −2.2305 |
| S9 | aspheric | −2.4232 | 0.3082 | 1.54 | 55.9 | −2.19 | 0.0000 |
| S10 | aspheric | 2.3905 | 0.3126 | | | | −1.0000 |
| S11 | spherical | infinite | 0.2100 | 1.52 | 64.2 | | |
| S12 | spherical | infinite | 0.3869 | | | | |
| S13 | spherical | infinite | | | | | |

TABLE 8

| Surface number | A4 | A6 | A8 | A10 | A12 |
|---|---|---|---|---|---|
| S1 | −3.5385E−04 | 5.3073E−02 | −3.7841E−01 | 1.8306E+00 | −5.4898E+00 |
| S2 | −1.1430E−01 | 1.9523E−02 | 1.0447E+00 | −6.1942E+00 | 2.0990E+01 |
| S3 | −1.3682E−01 | 3.5085E−01 | −1.2814E−01 | 6.9080E−01 | −7.7104E+00 |
| S4 | −4.2626E−02 | 4.4030E−01 | −1.5125E−01 | 1.0409E+01 | −4.8319E+01 |
| S5 | −2.2860E−01 | −5.8566E−02 | 9.0843E−01 | −8.2374E+00 | 3.8272E+01 |
| S6 | −1.6359E−01 | −4.1448E−02 | −1.1219E−01 | 7.7608E−01 | −2.6143E+00 |
| S7 | 1.6176E−02 | −1.3801E−01 | 2.4663E−01 | −3.4715E−01 | 3.3284E−01 |
| S8 | 8.8639E−02 | −1.3168E−01 | 1.2309E−01 | −2.0848E−02 | −3.5587E−02 |
| S9 | −9.7338E−02 | −4.6386E−02 | 1.5029E−01 | −1.0202E−01 | 3.7000E−02 |

TABLE 8-continued

| | | | | |
|---|---|---|---|---|
| S10 | −2.3669E−01 | 1.5095E−01 | −7.8105E−02 | 3.0807E−02 | −8.9196E−03 |

| Surface number | A14 | A16 | A18 | A20 |
|---|---|---|---|---|
| S1 | 1.0191E+01 | −1.1441E+01 | 7.1016E+00 | −1.8867E+00 |
| S2 | −4.3818E+01 | 5.4330E+01 | −3.6459E+01 | 1.0113E+01 |
| S3 | 2.7827E+01 | −4.9740E+01 | 4.5286E+01 | −1.6751E+01 |
| S4 | 1.3353E+02 | −2.1517E+02 | 1.8770E+02 | 6.8093E+01 |
| S5 | −1.0603E+02 | 1.7263E+02 | −1.5313E+02 | 5.7436E+01 |
| S6 | 4.8688E+00 | −5.1375E+00 | 2.8593E+00 | −6.2796E−01 |
| S7 | −2.1692E−01 | 8.9290E−02 | −2.0142E−02 | 1.8666E−03 |
| S8 | 2.6262E−02 | −8.0071E−03 | 1.1877E−03 | −7.0349E−05 |
| S9 | −8.1781E−03 | 1.1122E−03 | −8.6201E−05 | 2.9344E−06 |
| S10 | 1.7896E−03 | −2.3411E−04 | 1.7998E−05 | −6.1552E−07 |

Figure 8A:
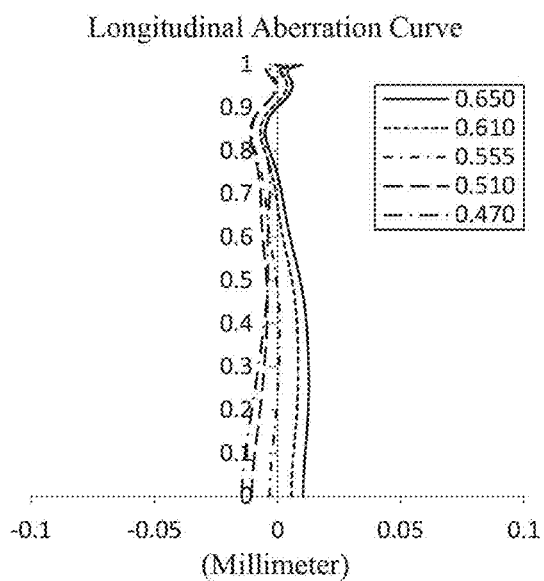
FIGS. 8A-8D illustrate a longitudinal aberration curve, an astigmatic curve, a distortion curve and a lateral color curve of the optical imaging lens assembly according to embodiment 4, respectively.
Figure 8B:
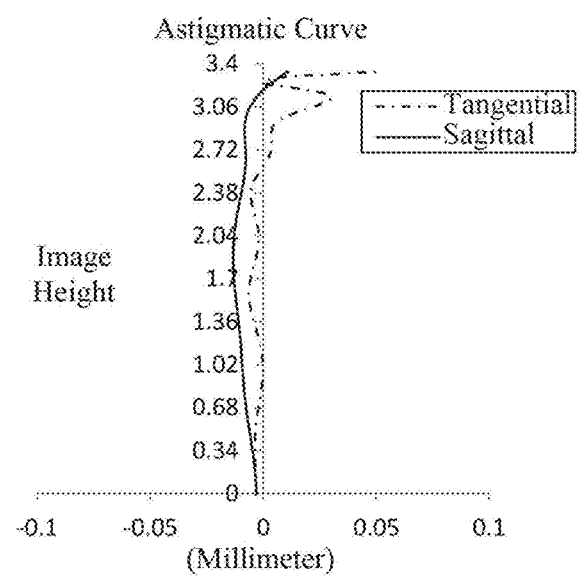
Figure 8C:
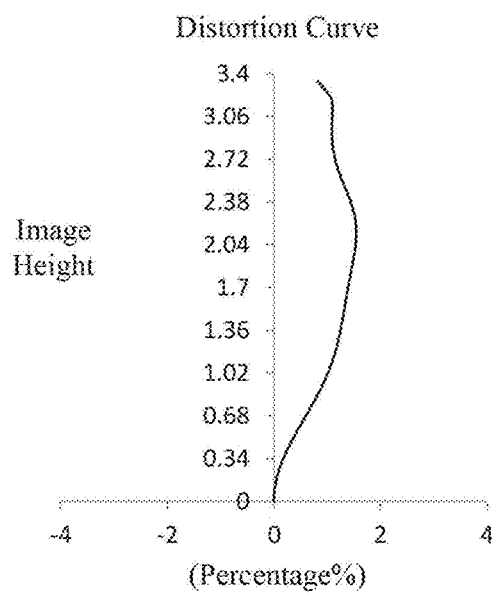
Figure 8D:
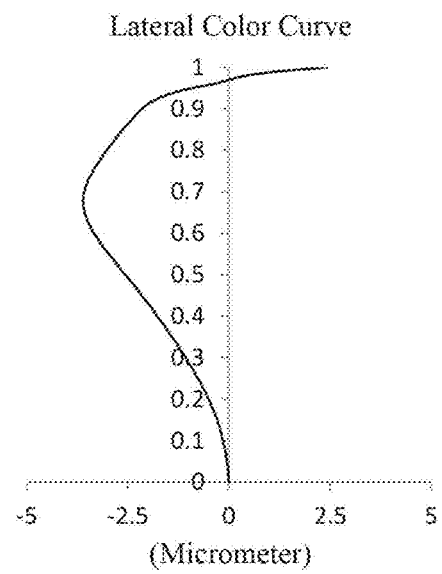

FIG. 8A illustrates a longitudinal aberration curve of the optical imaging lens assembly according to embodiment 4, representing deviations of focal points converged by light of different wavelengths after passing through the optical imaging lens assembly. FIG. 8B illustrates an astigmatic curve of the optical imaging lens assembly according to embodiment 4, representing a curvature of a tangential plane and a curvature of a sagittal plane. FIG. 8C illustrates a distortion curve of the optical imaging lens assembly according to embodiment 4, representing amounts of distortion at different image heights. FIG. 8D illustrates a lateral color curve of the optical imaging lens assembly according to embodiment 4, representing deviations at different image heights on an imaging plane after light passes through the optical imaging lens assembly. It can be seen from FIG. 8A to FIG. 8D that the optical imaging lens assembly provided in embodiment 4 can achieve good image quality.

Embodiment 5

Figure 9:
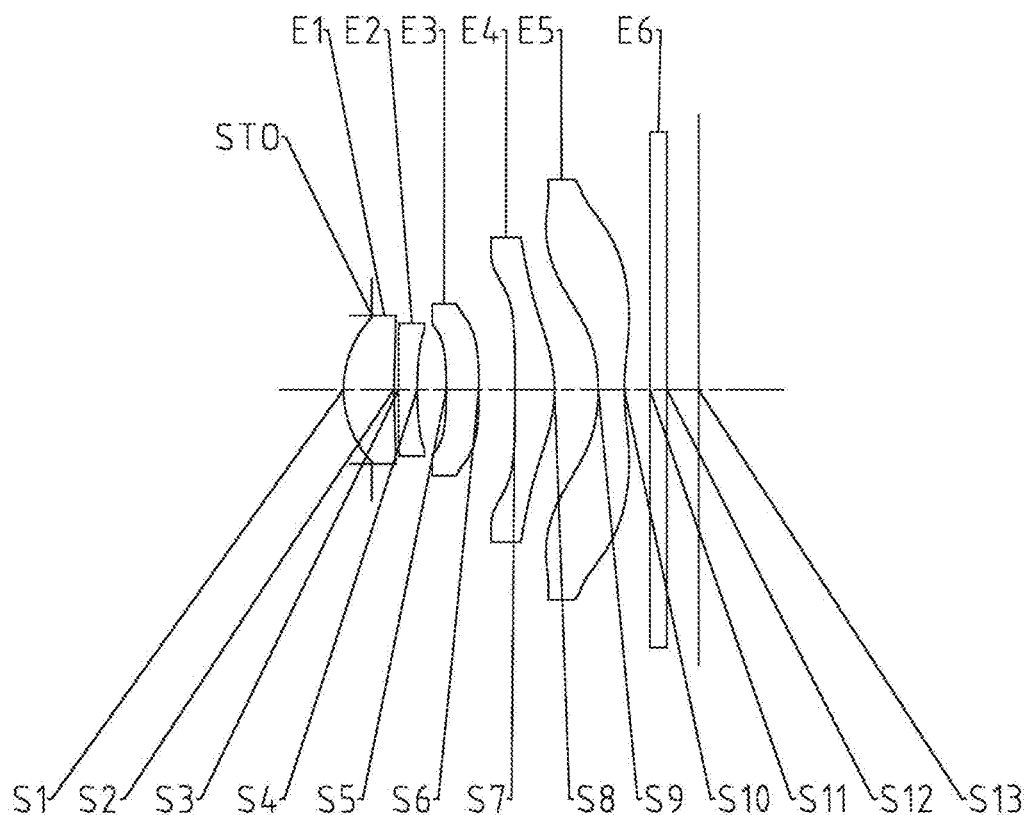
FIG. 9 is a schematic structural view of an optical imaging lens assembly according to embodiment 5 of the present disclosure.

An optical imaging lens assembly according to embodiment 5 of the present disclosure is described below with reference to FIG. 9 to FIG. 10D. FIG. 9 is a schematic structural view of the optical imaging lens assembly according to embodiment 5 of the present disclosure.

As shown in FIG. 9, the optical imaging lens assembly includes, sequentially from an object side to an image side along an optical axis: a stop STO, a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a convex surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

In this embodiment, a total effective focal length f of the optical imaging lens assembly is 3.82 mm, a total length TTL of the optical imaging lens assembly is 4.36 mm, half of a diagonal length ImgH of an effective pixel area on the imaging plane S13 is 3.38 mm, half of a maximal field-of-view angle Semi-FOV of the optical imaging lens assembly is 40.8°, and the ratio f/EPD of the total effective focal length f of the optical imaging lens assembly with respect to an entrance pupil diameter EPD of the optical imaging lens assembly is 2.09.

Table 9 is a table illustrating the basic parameters of the optical imaging lens assembly in embodiment 5, wherein the units for radius of curvature, thickness/distance, and focal length are millimeter (mm). Table 10 below shows high-order coefficients applicable to each aspheric surface in embodiment 5, wherein the surface type of each aspheric surface may be defined by the formula (1) given above in embodiment 1.

TABLE 9

| Surface number | Surface type | Radius of curvature | Thickness/ distance | Material | | Focal length | Conic coefficient |
|---|---|---|---|---|---|---|---|
| | | | | Refractive index | Abbe number | | |
| OBJ | spherical | infinite | 370.000 | | | | |
| STO | spherical | infinite | −0.3481 | | | | |
| S1 | aspheric | 1.3248 | 0.6195 | 1.55 | 56.1 | 3.05 | 0.0000 |
| S2 | aspheric | 5.4349 | 0.0570 | | | | 0.0000 |
| S3 | aspheric | 43.4166 | 0.2300 | 1.67 | 20.4 | −8.28 | 0.0000 |
| S4 | aspheric | 4.8811 | 0.3575 | | | | 0.0000 |
| S5 | aspheric | −8.7569 | 0.3978 | 1.55 | 56.1 | −49.99 | 0.0000 |
| S6 | aspheric | −13.1005 | 0.4435 | | | | 0.0000 |
| S7 | aspheric | −39.9957 | 0.4868 | 1.55 | 56.1 | 3.15 | 0.0000 |
| S8 | aspheric | −1.6538 | 0.5362 | | | | −1.4917 |
| S9 | aspheric | −2.4206 | 0.3180 | 1.54 | 55.9 | −2.25 | 0.0000 |
| S10 | aspheric | 2.5104 | 0.3147 | | | | −1.0000 |

TABLE 9-continued

| Surface number | Surface type | Radius of curvature | Thickness/ distance | Material Refractive index | Material Abbe number | Focal length | Conic coefficient |
|---|---|---|---|---|---|---|---|
| S11 | spherical | infinite | 0.2100 | 1.52 | 64.2 | | |
| S12 | spherical | infinite | 0.3890 | | | | |
| S13 | spherical | infinite | | | | | |

TABLE 10

| Surface number | A4 | A6 | A8 | A10 | A12 |
|---|---|---|---|---|---|
| S1 | 9.2920E−05 | 6.6150E−02 | −4.6876E−01 | 2.2736E+00 | −6.8969E+00 |
| S2 | −1.3440E−01 | 4.7047E−03 | 8.0047E−01 | −3.1549E+00 | 6.8291E+00 |
| S3 | −1.3844E−01 | 3.2083E−01 | −5.9398E−01 | 4.5885E+00 | −2.2225E+01 |
| S4 | −1.0155E−02 | 3.4692E−01 | −1.2824E+00 | 9.3958E+00 | −4.4661E+01 |
| S5 | −2.2561E−01 | −3.8804E−01 | 3.5295E+00 | −2.2534E+01 | 8.7795E+01 |
| S6 | −1.8780E−01 | 1.3349E−02 | −4.9723E−01 | 2.2851E+00 | −6.1579E+00 |
| S7 | 2.1561E−02 | −1.1378E−01 | 1.5602E−01 | −1.8459E−01 | 1.4820E−01 |
| S8 | 1.0805E−01 | −1.2151E−01 | 1.2601E−01 | −4.2221E−02 | −2.0802E−02 |
| S9 | −1.1511E−01 | −1.3559E−02 | 1.2819E−01 | −9.6389E−02 | 3.7414E−02 |
| S10 | −2.3965E−01 | 1.5691E−01 | −8.2566E−02 | 3.2736E−02 | −9.3539E−03 |

| Surface number | A14 | A16 | A18 | A20 |
|---|---|---|---|---|
| S1 | 1.2919E+01 | −1.4547E+01 | 8.9832E+00 | −2.3594E+00 |
| S2 | −8.2702E+00 | 3.6967E+00 | 2.0481E+00 | −2.0223E+00 |
| S3 | 5.8941E+01 | −8.8684E+01 | 7.1681E+01 | −2.4176E+01 |
| S4 | 1.2700E+02 | −2.1157E+02 | 1.9151E+02 | −7.2140E+01 |
| S5 | −2.1589E+02 | 3.2302E+02 | −2.6889E+02 | 9.5770E+01 |
| S6 | 1.0014E+01 | −9.6579E+00 | 5.0800E+00 | −1.1024E+00 |
| S7 | −8.3714E−02 | 3.2072E−02 | −7.0283E−03 | 6.4046E−04 |
| S8 | 2.2542E−02 | −7.9207E−03 | 1.2982E−03 | −8.3679E−05 |
| S9 | −8.7522E−03 | 1.2485E−03 | −1.0055E−04 | 3.5232E−06 |
| S10 | 1.8120E−03 | −2.2375E−04 | 1.5977E−05 | −5.0551E−07 |

Figure 10A:
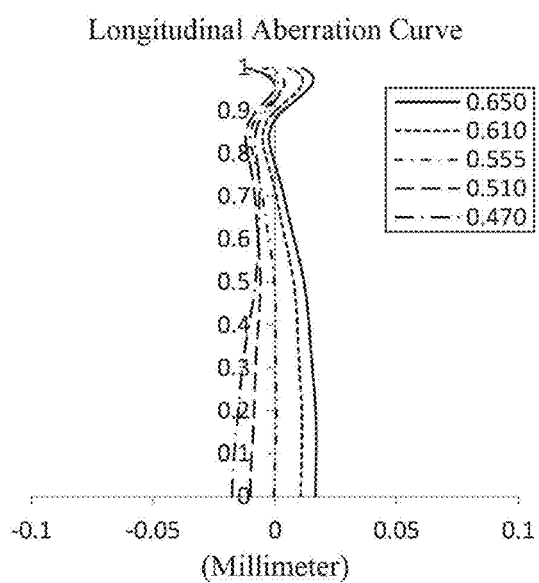
Figure 10B:
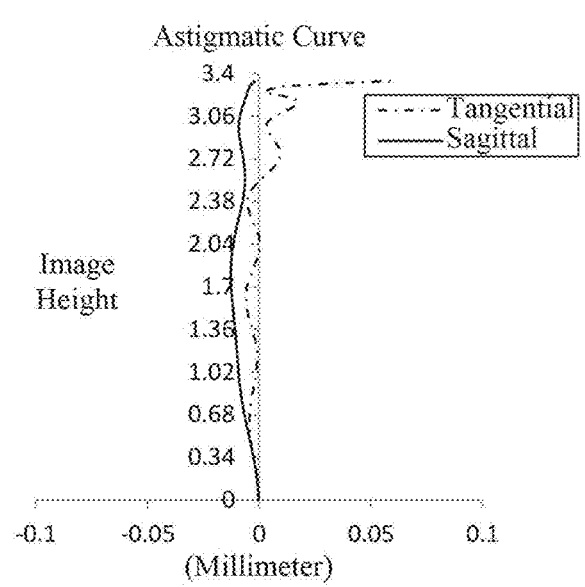

FIG. 10A illustrates a longitudinal aberration curve of the optical imaging lens assembly according to embodiment 5, representing deviations of focal points converged by light of different wavelengths after passing through the optical imaging lens assembly. FIG. 10B illustrates an astigmatic curve of the optical imaging lens assembly according to embodiment 5, representing a curvature of a tangential plane and a curvature of a sagittal plane. FIG. 10C illustrates a distortion curve of the optical imaging lens assembly according to embodiment 5, representing amounts of distortion at different image heights. FIG. 10D illustrates a lateral color curve of the optical imaging lens assembly according to embodiment 5, representing deviations at different image heights on an imaging plane after light passes through the optical imaging lens assembly. It can be seen from FIG. 10A to FIG. 10D that the optical imaging lens assembly provided in embodiment 5 can achieve good image quality.

Embodiment 6

An optical imaging lens assembly according to embodiment 6 of the present disclosure is described below with reference to FIG. 11 to FIG. 12D. FIG. 11 is a schematic structural view of the optical imaging lens assembly according to embodiment 6 of the present disclosure.

As shown in FIG. 11, the optical imaging lens assembly includes, sequentially from an object side to an image side along an optical axis: a stop STO, a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

In this embodiment, a total effective focal length f of the optical imaging lens assembly is 3.82 mm, a total length TTL of the optical imaging lens assembly is 4.36 mm, half of a diagonal length ImgH of an effective pixel area on the imaging plane S13 is 3.38 mm, half of a maximal field-of-view angle Semi-FOV of the optical imaging lens assembly is 40.8°, and the ratio f/EPD of the total effective focal length f of the optical imaging lens assembly with respect to an entrance pupil diameter EPD of the optical imaging lens assembly is 2.09.

Table 11 is a table illustrating the basic parameters of the optical imaging lens assembly in embodiment 6, wherein the units for radius of curvature, thickness/distance, and focal length are millimeter (mm). Table 12 below shows high-order coefficients applicable to each aspheric surface in embodiment 6, wherein the surface type of each aspheric surface may be defined by the formula (1) given above in embodiment 1.

TABLE 11

| Surface number | Surface type | Radius of curvature | Thickness/ distance | Material Refractive index | Abbe number | Focal length | Conic coefficient |
|---|---|---|---|---|---|---|---|
| OBJ | spherical | infinite | 370.000 | | | | |
| STO | spherical | infinite | −0.3202 | | | | |
| S1 | aspheric | 1.3233 | 0.6154 | 1.55 | 56.1 | 3.10 | 0.0000 |
| S2 | aspheric | 5.0762 | 0.0648 | | | | 0.0000 |
| S3 | aspheric | 43.9220 | 0.2200 | 1.67 | 20.4 | −8.29 | 0.0000 |
| S4 | aspheric | 4.8941 | 0.3651 | | | | 0.0000 |
| S5 | aspheric | −92.6000 | 0.3608 | 1.55 | 56.1 | −85.48 | 0.0000 |
| S6 | aspheric | 94.2000 | 0.4109 | | | | 0.0000 |
| S7 | aspheric | −28.9382 | 0.5871 | 1.55 | 56.1 | 3.17 | 0.0000 |
| S8 | aspheric | −1.6445 | 0.5271 | | | | −2.0796 |
| S9 | aspheric | −2.4228 | 0.3062 | 1.54 | 55.9 | −2.27 | 0.0000 |
| S10 | aspheric | 2.5489 | 0.3092 | | | | −1.0000 |
| S11 | spherical | infinite | 0.2100 | 1.52 | 64.2 | | |
| S12 | spherical | infinite | 0.3835 | | | | |
| S13 | spherical | infinite | | | | | |

TABLE 12

| Surface number | A4 | A6 | A8 | A10 | A12 |
|---|---|---|---|---|---|
| S1 | 6.4472E−04 | 3.9617E−02 | −3.0616E−01 | 1.6233E+00 | −5.3208E+00 |
| S2 | −1.4273E−01 | −3.2185E−03 | 9.4742E−01 | −4.3121E+00 | 1.1868E+01 |
| S3 | −1.4991E−01 | 2.6600E−01 | 3.0324E−01 | −1.9007E−01 | −7.1951E+00 |
| S4 | −2.4634E−02 | 4.9752E−01 | −2.4942E+00 | 1.7725E+01 | −7.8787E+01 |
| S5 | −2.3018E−01 | −2.4415E−01 | 2.3412E+00 | −1.4397E+01 | 5.2948E+01 |
| S6 | −1.9610E−01 | 3.3477E−02 | −4.9087E−01 | 2.0853E+00 | −5.4540E+00 |
| S7 | 5.9581E−03 | −1.0941E−01 | 1.8499E−01 | −2.4227E−01 | 2.0513E−01 |
| S8 | 7.1309E−02 | −9.4691E−02 | 8.4113E−02 | 1.6856E−02 | −6.3125E−02 |
| S9 | −1.0681E−01 | −3.0995E−02 | 1.4276E−01 | −1.0232E−01 | 3.8518E−02 |
| S10 | −2.2463E−01 | 1.3678E−01 | −6.5852E−02 | 2.4107E−02 | −6.5365E−03 |

| Surface number | A14 | A16 | A18 | A20 |
|---|---|---|---|---|
| S1 | 1.0577E+01 | −1.2518E+01 | 8.0721E+00 | −2.2044E+00 |
| S2 | −2.0576E+01 | 2.0838E+01 | −1.0806E+01 | 2.0130E+00 |
| S3 | 2.9967E+01 | −5.5504E+01 | 5.1048E+01 | −1.8866E+01 |
| S4 | 2.1101E+02 | −3.3379E+02 | 2.8818E+02 | −1.0421E+02 |
| S5 | −1.2253E+02 | 1.7250E+02 | −1.3521E+02 | 4.5460E+01 |
| S6 | 8.6579E+00 | −8.1547E+00 | 4.1862E+00 | −8.8598E−01 |
| S7 | −1.1643E−01 | 4.3503E−02 | −9.3119E−03 | 8.3919E−04 |
| S8 | 3.8879E−02 | −1.1404E−02 | 1.6817E−03 | −1.0041E−04 |
| S9 | −8.7690E−03 | 1.2202E−03 | −9.6144E−05 | 3.3070E−06 |
| S10 | 1.2386E−03 | −1.5420E−04 | 1.1415E−05 | −3.8157E−07 |

Figure 12A:
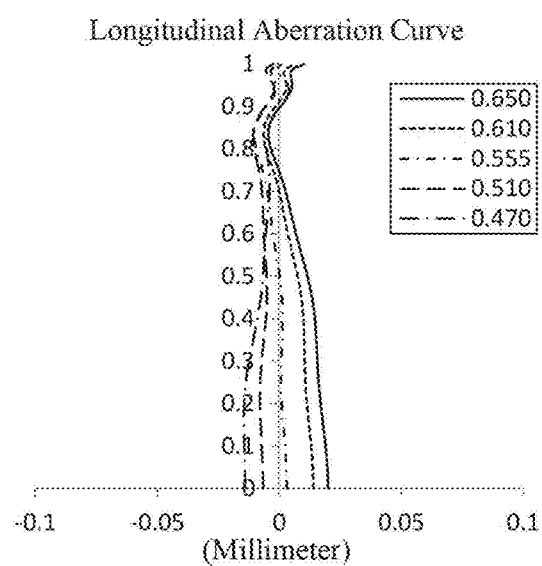
FIGS. 12A-12D illustrate a longitudinal aberration curve, an astigmatic curve, a distortion curve and a lateral color curve of the optical imaging lens assembly according to embodiment 6, respectively.
Figure 12B:
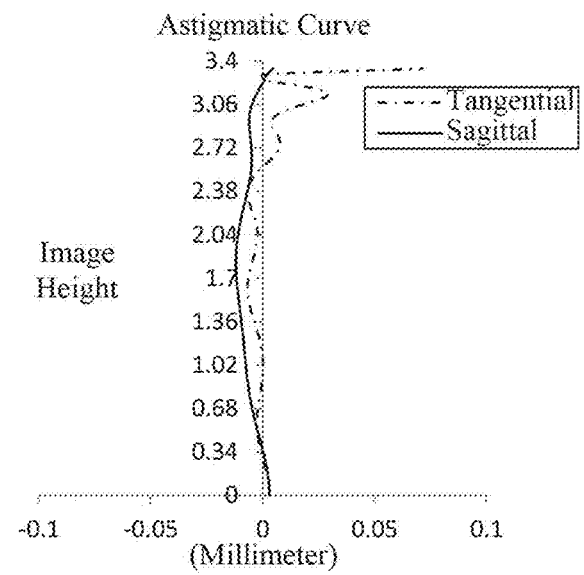
Figure 12C:
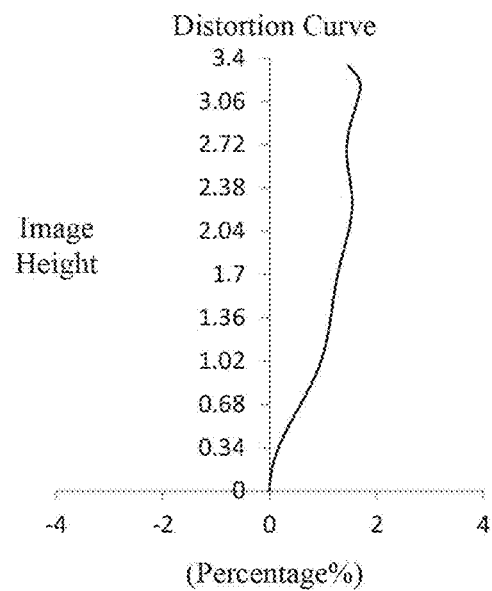
Figure 12D:
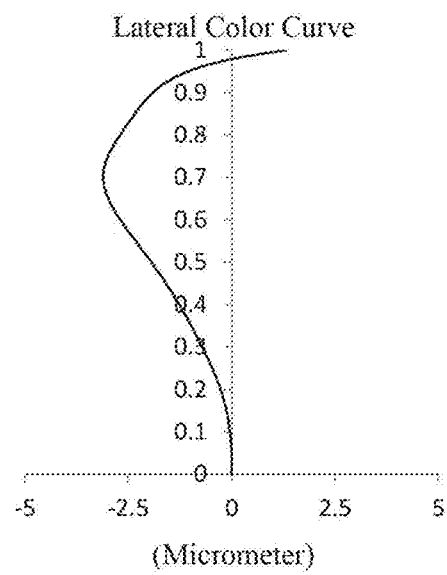

FIG. 12A illustrates a longitudinal aberration curve of the optical imaging lens assembly according to embodiment 6, representing deviations of focal points converged by light of different wavelengths after passing through the optical imaging lens assembly. FIG. 12B illustrates an astigmatic curve of the optical imaging lens assembly according to embodiment 6, representing a curvature of a tangential plane and a curvature of a sagittal plane. FIG. 12C illustrates a distortion curve of the optical imaging lens assembly according to embodiment 6, representing amounts of distortion at different image heights. FIG. 12D illustrates a lateral color curve of the optical imaging lens assembly according to embodiment 6, representing deviations at different image heights on an imaging plane after light passes through the optical imaging lens assembly. It can be seen from FIG. 12A to FIG. 12D that the optical imaging lens assembly provided in embodiment 6 can achieve good image quality.

Embodiment 7

Figure 13:
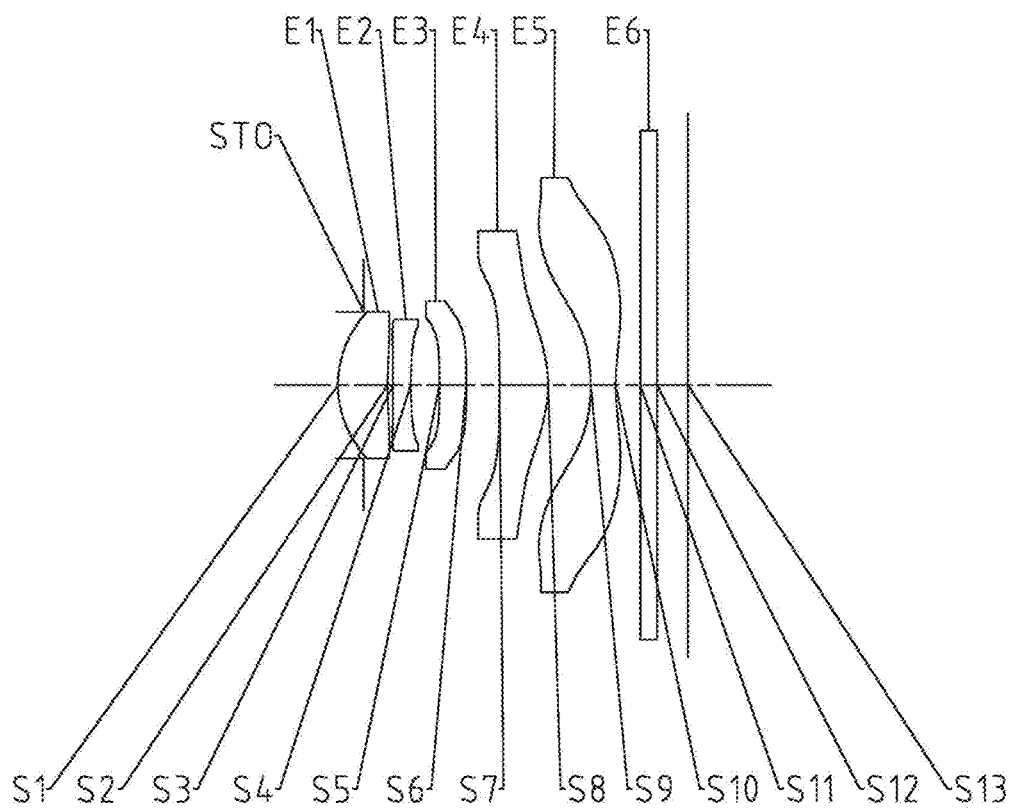
FIG. 13 is a schematic structural view of an optical imaging lens assembly according to embodiment 7 of the present disclosure.

An optical imaging lens assembly according to embodiment 7 of the present disclosure is described below with reference to FIG. 13 to FIG. 14D. FIG. 13 is a schematic structural view of the optical imaging lens assembly according to embodiment 7 of the present disclosure.

As shown in FIG. 13, the optical imaging lens assembly includes, sequentially from an object side to an image side along an optical axis: a stop STO, a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has negative refractive power, an object-side surface S5 thereof is a concave surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

In this embodiment, a total effective focal length f of the optical imaging lens assembly is 3.82 mm, a total length TTL of the optical imaging lens assembly is 4.36 mm, half of a diagonal length ImgH of an effective pixel area on the imaging plane S13 is 3.38 mm, half of a maximal field-of-view angle Semi-FOV of the optical imaging lens assembly is 40.8°, and the ratio f/EPD of the total effective focal length f of the optical imaging lens assembly with respect to an entrance pupil diameter EPD of the optical imaging lens assembly is 2.09.

Table 13 is a table illustrating the basic parameters of the optical imaging lens assembly in embodiment 7, wherein the units for radius of curvature, thickness/distance, and focal length are millimeter (mm). Table 14 below shows high-order coefficients applicable to each aspheric surface in embodiment 7, wherein the surface type of each aspheric surface may be defined by the formula (1) given above in embodiment 1.

TABLE 13

| Surface number | Surface type | Radius of curvature | Thickness/ distance | Material Refractive index | Material Abbe number | Focal length | Conic coefficient |
|---|---|---|---|---|---|---|---|
| OBJ | spherical | infinite | 370.000 | | | | |
| STO | spherical | infinite | −0.3201 | | | | |
| S1 | aspheric | 1.3168 | 0.6178 | 1.55 | 56.1 | 3.08 | 0.0000 |
| S2 | aspheric | 5.0856 | 0.0697 | | | | 0.0000 |
| S3 | aspheric | −76.2000 | 0.2200 | 1.67 | 20.4 | −8.25 | 0.0000 |
| S4 | aspheric | 5.9274 | 0.3585 | | | | 0.0000 |
| S5 | aspheric | −92.6000 | 0.3314 | 1.55 | 56.1 | −85.48 | 0.0000 |
| S6 | aspheric | 94.2000 | 0.4149 | | | | 0.0000 |
| S7 | aspheric | −29.5563 | 0.6068 | 1.55 | 56.1 | 3.22 | 0.0000 |
| S8 | aspheric | −1.6727 | 0.5313 | | | | −2.3448 |
| S9 | aspheric | −2.4218 | 0.3088 | 1.54 | 55.9 | −2.28 | 0.0000 |
| S10 | aspheric | 2.5902 | 0.3082 | | | | −1.0000 |
| S11 | spherical | infinite | 0.2100 | 1.52 | 64.2 | | |
| S12 | spherical | infinite | 0.3826 | | | | |
| S13 | spherical | infinite | | | | | |

TABLE 14

| Surface number | A4 | A6 | A8 | A10 | A12 |
|---|---|---|---|---|---|
| S1 | −1.6064E−03 | 6.3233E−02 | −4.7831E−01 | 2.3037E+00 | −6.9060E+00 |
| S2 | −1.3968E−01 | 1.5765E−02 | 5.4400E−01 | −2.0668E+00 | 4.5264E+00 |
| S3 | −1.3900E−01 | 3.0585E−01 | −8.3121E−02 | 1.6462E+00 | −1.2408E+01 |
| S4 | −1.3809E−01 | 4.1644E−01 | −1.3381E+00 | 9.5893E+01 | −4.4375E+01 |
| S5 | −2.6200E−01 | −2.0514E−01 | 2.4202E+00 | −1.7018E+01 | 6.8371E+01 |
| S6 | −2.1645E−01 | 1.2747E−02 | −3.8540E−01 | 1.8957E+00 | −5.6191E+00 |
| S7 | 7.7864E−03 | −1.2985E−01 | 2.7079E−01 | −4.0393E−01 | 3.8260E−01 |
| S8 | 6.0317E−02 | −8.8429E−02 | 9.8999E−02 | −1.1950E−01 | −3.9968E−02 |
| S9 | −1.2401E−01 | 1.0931E−02 | 9.8344E−02 | −7.6338E−02 | 2.9345E−02 |
| S10 | −2.2703E−01 | 1.4492E−01 | −7.2621E−02 | 2.6970E−02 | −7.2243E−03 |

| Surface number | A14 | A16 | A18 | A20 |
|---|---|---|---|---|
| S1 | 1.2738E+01 | −1.4156E+01 | 8.6470E+00 | −2.2538E+00 |
| S2 | −5.6689E+00 | 2.4930E+00 | 1.6976E+00 | −1.5908E+00 |
| S3 | 3.8930E+01 | −6.4441E+01 | 5.5661E+01 | −1.9729E+01 |
| S4 | 1.2118E+02 | −1.9244E+02 | 1.6525E+02 | −5.8738E+01 |
| S5 | −1.6869E+02 | 2.4928E+02 | −2.0312E+02 | 7.0428E+01 |
| S6 | 9.8240E+00 | −1.0005E+00 | 5.4661E+00 | −1.2124E+00 |
| S7 | −2.3203E−01 | 8.6897E−02 | −1.7966E−02 | 1.5499E−03 |
| S8 | 2.8375E−02 | −8.6208E−03 | 1.2800E−03 | −7.6004E−05 |
| S9 | −6.7577E−03 | 9.5133E−04 | −7.6019E−05 | 2.6595E−06 |
| S10 | 1.3292E−03 | −1.5931E−04 | 1.1349E−05 | −3.6762E−07 |

Figure 14A:
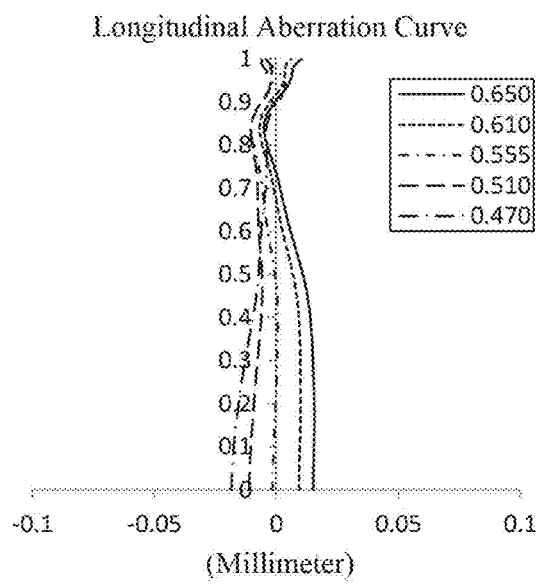
Figure 14B:
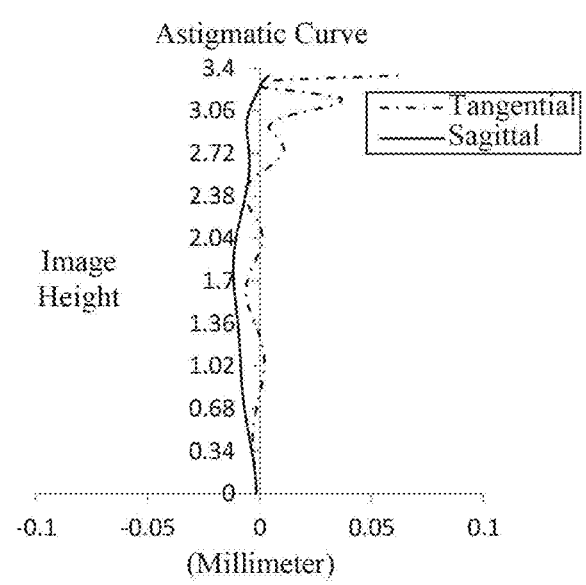

FIG. 14A illustrates a longitudinal aberration curve of the optical imaging lens assembly according to embodiment 7, representing deviations of focal points converged by light of different wavelengths after passing through the optical imaging lens assembly. FIG. 14B illustrates an astigmatic curve of the optical imaging lens assembly according to embodiment 7, representing a curvature of a tangential plane and a curvature of a sagittal plane. FIG. 14C illustrates a distortion curve of the optical imaging lens assembly according to embodiment 7, representing amounts of distortion at different image heights. FIG. 14D illustrates a lateral color curve of the optical imaging lens assembly according to embodiment 7, representing deviations at different image heights on an imaging plane after light passes through the optical imaging lens assembly. It can be seen from FIG. 14A to FIG. 14D that the optical imaging lens assembly provided in embodiment 7 can achieve good image quality.

Embodiment 8

An optical imaging lens assembly according to embodiment 8 of the present disclosure is described below with reference to FIG. 15 to FIG. 16D. FIG. 15 is a schematic structural view of the optical imaging lens assembly according to embodiment 8 of the present disclosure.

As shown in FIG. 15, the optical imaging lens assembly includes, sequentially from an object side to an image side along an optical axis: a stop STO, a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

In this embodiment, a total effective focal length f of the optical imaging lens assembly is 3.82 mm, a total length TTL of the optical imaging lens assembly is 4.36 mm, half of a diagonal length ImgH of an effective pixel area on the imaging plane S13 is 3.38 mm, half of a maximal field-of-view angle Semi-FOV of the optical imaging lens assembly is 40.8°, and the ratio f/EPD of the total effective focal length f of the optical imaging lens assembly with respect to an entrance pupil diameter EPD of the optical imaging lens assembly is 2.09.

Table 15 is a table illustrating the basic parameters of the optical imaging lens assembly in embodiment 8, wherein the units for radius of curvature, thickness/distance, and focal length are millimeter (mm). Table 16 below shows high-order coefficients applicable to each aspheric surface in embodiment 8, wherein the surface type of each aspheric surface may be defined by the formula (1) given above in embodiment 1.

TABLE 15

| Surface number | Surface type | Radius of curvature | Thickness/ distance | Material Refractive index | Abbe number | Focal length | Conic coefficient |
|---|---|---|---|---|---|---|---|
| OBJ | spherical | infinite | 370.000 | | | | |
| STO | spherical | infinite | −0.3223 | | | | |
| S1 | aspheric | 1.3143 | 0.6173 | 1.55 | 56.1 | 3.08 | 0.0000 |
| S2 | aspheric | 5.0203 | 0.0681 | | | | 0.0000 |
| S3 | aspheric | −86.8000 | 0.2200 | 1.67 | 20.4 | −8.27 | 0.0000 |
| S4 | aspheric | 5.8807 | 0.3604 | | | | 0.0000 |
| S5 | aspheric | 91.1000 | 0.3037 | 1.55 | 56.1 | −66.25 | 0.0000 |
| S6 | aspheric | 25.8597 | 0.4123 | | | | 0.0000 |
| S7 | aspheric | −38.5067 | 0.6456 | 1.55 | 56.1 | 3.18 | 0.0000 |
| S8 | aspheric | −1.6689 | 0.5246 | | | | −2.2979 |
| S9 | aspheric | −2.4219 | 0.3068 | 1.54 | 55.9 | −2.29 | 0.0000 |
| S10 | aspheric | 2.6002 | 0.3084 | | | | −1.0000 |
| S11 | spherical | infinite | 0.2100 | 1.52 | 64.2 | | |
| S12 | spherical | infinite | 0.3828 | | | | |
| S13 | spherical | infinite | | | | | |

TABLE 16

| Surface number | A4 | A6 | A8 | A10 | A12 |
|---|---|---|---|---|---|
| S1 | −9.5306E−04 | 5.1657E−02 | −3.7904E−01 | 1.8068E+00 | −5.4113E+00 |
| S2 | −1.4120E−01 | 9.3440E−03 | 6.2098E−01 | −2.3629E+00 | 5.1320E+00 |
| S3 | −1.3577E−01 | 2.6156E−01 | 3.7612E−01 | −8.6048E−01 | −4.1704E+00 |
| S4 | −1.2992E−02 | 4.6820E−01 | −2.0263E+00 | 1.4766E+01 | −6.7628E+01 |
| S5 | −2.6401E−01 | −3.7723E−01 | 3.7179E+00 | −2.2640E+01 | 8.2931E+01 |
| S6 | −2.3148E−01 | 2.7383E−02 | −4.3358E−01 | 2.0715E+00 | −6.1226E+00 |
| S7 | −1.5022E−03 | −9.3163E−02 | 1.9701E−01 | −3.0301E−01 | 2.9352E−01 |
| S8 | 5.1769E−02 | −6.8413E−02 | 6.7548E−02 | 1.7773E−02 | −5.5987E−02 |
| S9 | −1.2609E−01 | 1.9689E−02 | 8.4771E−02 | −6.5945E−02 | 2.4833E−02 |

TABLE 16-continued

| S10 | −2.2494E−01 | 1.4434E−01 | −7.2926E−02 | 2.7294E−02 | −7.3488E−03 |

| Surface number | A14 | A16 | A18 | A20 |
|---|---|---|---|---|
| S1 | 9.9855E+00 | −1.1117E+01 | 6.7999E+00 | −1.7784E+00 |
| S2 | −6.1944E+00 | 2.2864E+00 | 2.3858E+00 | −1.9253E+00 |
| S3 | 2.2201E+01 | −4.3915 E+01 | 4.1687E+01 | −1.5654E+01 |
| S4 | 1.8465E+02 | −2.9580E+02 | 2.5748E+02 | −9.3417E+01 |
| S5 | −1.9114E+02 | 2.6814E+02 | −2.0965E+02 | 7.0193E+01 |
| S6 | 1.0703E+01 | −1.0916E+01 | 5.9700E+00 | −1.3209E+00 |
| S7 | −1.8219E−01 | 6.9845E−02 | −1.4727E−02 | 1.2894E−03 |
| S8 | 3.3322E−02 | −9.4674E−03 | 1.3505E−03 | −7.7883E−05 |
| S9 | −5.5866E−03 | 7.7063E−04 | −6.0677E−05 | 2.1062E−06 |
| S10 | 1.3552E−03 | −1.6243E−04 | 1.1542E−05 | −3.7221E−07 |

Figure 16A:
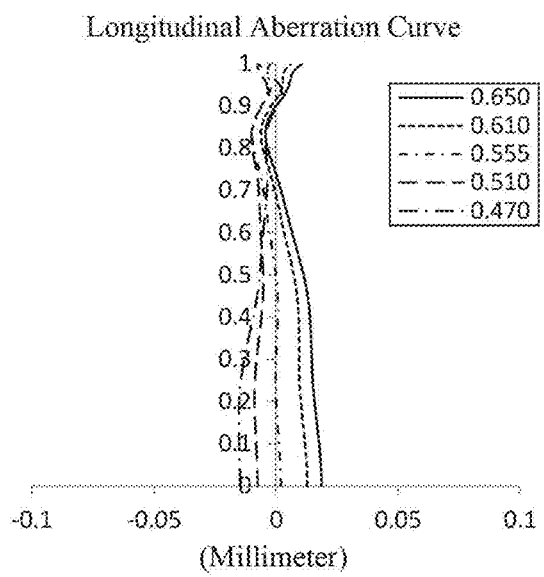
FIGS. 16A-16D illustrate a longitudinal aberration curve, an astigmatic curve, a distortion curve and a lateral color curve of the optical imaging lens assembly according to embodiment 8, respectively.
Figure 16B:
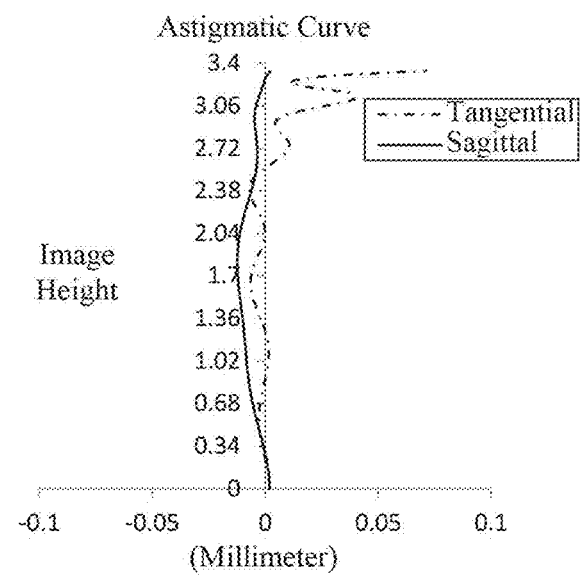
Figure 16C:
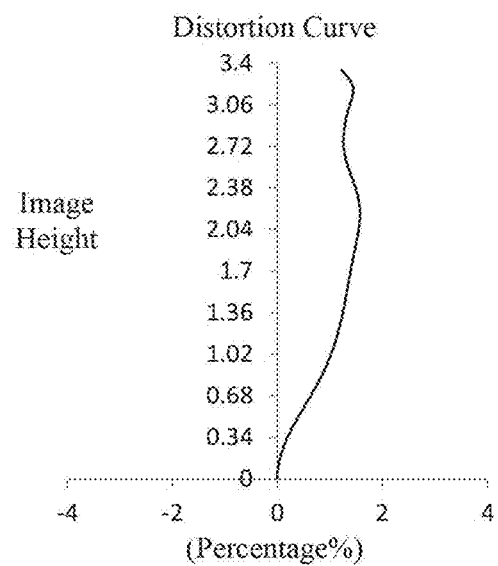
Figure 16D:
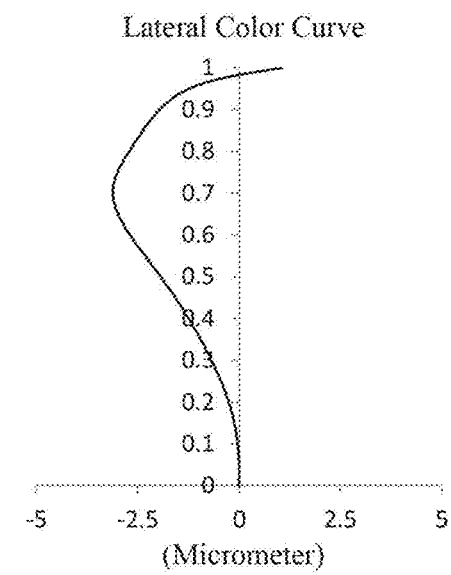

FIG. 16A illustrates a longitudinal aberration curve of the optical imaging lens assembly according to embodiment 8, representing deviations of focal points converged by light of different wavelengths after passing through the optical imaging lens assembly. FIG. 16B illustrates an astigmatic curve of the optical imaging lens assembly according to embodiment 8, representing a curvature of a tangential plane and a curvature of a sagittal plane. FIG. 16C illustrates a distortion curve of the optical imaging lens assembly according to embodiment 8, representing amounts of distortion at different image heights. FIG. 16D illustrates a lateral color curve of the optical imaging lens assembly according to embodiment 8, representing deviations at different image heights on an imaging plane after light passes through the optical imaging lens assembly. It can be seen from FIG. 16A to FIG. 16D that the optical imaging lens assembly provided in embodiment 8 can achieve good image quality.

Based on the above, embodiments 1 to 8 respectively satisfy the relationship shown in Table 17.

TABLE 17

| Conditional | Embodiment | | | | | | | |
|---|---|---|---|---|---|---|---|---|
| | 1 | 2 | 3 | 4 | 5 | 6 | 7 | 8 |
| TTL/ImgH | 1.31 | 1.29 | 1.29 | 1.29 | 1.29 | 1.29 | 1.29 | 1.29 |
| R9/f5 | 0.83 | 1.11 | 1.10 | 1.10 | 1.08 | 1.07 | 1.06 | 1.06 |
| CT5/T34 | 0.55 | 0.55 | 0.58 | 0.59 | 0.72 | 0.75 | 0.74 | 0.74 |
| DT11/DT51 | 0.40 | 0.39 | 0.39 | 0.39 | 0.39 | 0.39 | 0.39 | 0.39 |
| SAG41/SAG42 | 0.76 | 0.87 | 0.83 | 0.82 | 0.71 | 0.68 | 0.67 | 0.62 |
| SAG32/SAG52 | 0.34 | 0.48 | 0.37 | 0.39 | 0.46 | 0.42 | 0.43 | 0.42 |
| T23/DT22 | 0.42 | 0.41 | 0.39 | 0.39 | 0.48 | 0.49 | 0.48 | 0.48 |
| DT12/DT31 | 1.04 | 1.05 | 1.00 | 1.01 | 1.03 | 0.99 | 1.00 | 1.01 |
| f2/f45 | 0.45 | 0.67 | 0.54 | 0.59 | 0.33 | 0.35 | 0.38 | 0.33 |
| f/f123 | 0.91 | 0.91 | 0.91 | 0.92 | 0.84 | 0.85 | 0.85 | 0.85 |
| f1/f | 0.73 | 0.79 | 0.81 | 0.80 | 0.80 | 0.81 | 0.81 | 0.81 |
| f4/(f4 − f5) | 0.61 | 0.61 | 0.60 | 0.61 | 0.58 | 0.58 | 0.59 | 0.58 |
| (R2 − R1)/(R2 + R1) | 0.77 | 0.63 | 0.62 | 0.62 | 0.61 | 0.59 | 0.59 | 0.59 |
| R8/R4 | −0.57 | −0.29 | −0.39 | −0.33 | −0.34 | −0.34 | −0.28 | −0.28 |
| R10/(R10 − R9) | 0.66 | 0.49 | 0.50 | 0.50 | 0.51 | 0.51 | 0.52 | 0.52 |
| CT3/CT1 | 0.68 | 0.64 | 0.62 | 0.62 | 0.64 | 0.59 | 0.54 | 0.49 |
| CT4/(T34 + T45) | 0.48 | 0.44 | 0.51 | 0.53 | 0.50 | 0.63 | 0.64 | 0.69 |
| ET5/ET4 | 0.65 | 0.88 | 0.74 | 0.65 | 0.65 | 0.71 | 0.68 | 0.67 |

The present disclosure further provides an imaging apparatus, having an electronic photosensitive element which may be a photosensitive charge-coupled device (CCD) or a complementary metal-oxide semiconductor (CMOS). The imaging apparatus may be an independent imaging device such as a digital camera, or may be an imaging module integrated in a mobile electronic device, such as a mobile phone. The imaging apparatus is equipped with the optical imaging lens assembly described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising sequentially from an object side to an image side along an optical axis:
   a first lens, having positive refractive power and a convex object-side surface;
   a second lens, having refractive power, and a concave image-side surface;
   a third lens, having refractive power;
   a fourth lens, having refractive power; and
   a fifth lens, having negative refractive power, a concave object-side surface, and a concave image-side surface,
   wherein the optical imaging lens assembly satisfies:

$TTL/ImgH < 1.35$, $0.6 < R9/f5 < 1.2$, and $0.5 < ET5/ET4 < 1$, and where TTL is a distance along the optical axis from the object-side surface of the first lens to an imaging plane of the optical imaging lens assembly, ImgH is half of a diagonal length of an effective pixel area on the imaging plane of the optical imaging lens assembly, f5 is an effective focal length of the fifth lens, R9 is a radius of curvature of the object-side surface of the fifth lens, ET4 is an edge thickness of the fourth lens, and ET5 is an edge thickness of the fifth lens.

2. The optical imaging lens assembly according to claim 1, wherein $0.2<CT5/T34<0.6$, where CT5 is a center thickness along the optical axis of the fifth lens, and T34 is a spaced interval along the optical axis between the third lens and the fourth lens.

3. The optical imaging lens assembly according to claim 1, wherein $0.3<CT3/CT1<0.8$, where CT1 is a center thickness along the optical axis of the first lens, and CT3 is a center thickness along the optical axis of the third lens.

4. The optical imaging lens assembly according to claim 1, wherein $0.2<DT11/DT51<1.2$, where DT11 is a maximum effective radius of the object-side surface of the first lens, and DT51 is a maximum effective radius of the object-side surface of the fifth lens.

5. The optical imaging lens assembly according to claim 1, wherein $0.5<DT12/DT31<1.5$, where DT12 is a maximum effective radius of an image-side surface of the first lens, and DT31 is a maximum effective radius of an object-side surface of the third lens.

6. The optical imaging lens assembly according to claim 1, wherein $0.2<f2/f45<0.8$, where f2 is an effective focal length of the second lens, and f45 is a combined focal length of the fourth lens and the fifth lens.

7. The optical imaging lens assembly according to claim 1, wherein $0.5<f/f123<1.5$ where f is a total effective focal length of the optical imaging lens assembly, and f123 is a combined focal length of the first lens, the second lens, the third lens.

8. The optical imaging lens assembly according to claim 1, wherein $0.5<f1/f<1.5$, where f is a total effective focal length of the optical imaging lens assembly, and f1 is an effective focal length of the first lens.

9. The optical imaging lens assembly according to claim 1, wherein $0.5<f4/(f4-f5)<1.0$, where f4 is an effective focal length of the fourth lens and f5 is an effective focal length of the fifth lens.

10. The optical imaging lens assembly according to claim 1, wherein $0.3<(R2-R1)/(R2+R1)<1.3$, where R1 is a radius of curvature of the object-side surface of the first lens, and R2 is a radius of curvature of an image-side surface of the first lens.

11. The optical imaging lens assembly according to claim 1, wherein $-1.0<R8/R4<-0.2$, where R4 is a radius of curvature of the image-side surface of the second lens, and R8 is a radius of curvature of an image-side surface of the fourth lens.

12. The optical imaging lens assembly according to claim 1, wherein $0.3<R10/(R10-R9)<1.0$, where R9 is a radius of curvature of the object-side surface of the fifth lens, and R10 is a radius of curvature of the image-side surface of the fifth lens.

13. The optical imaging lens assembly according to claim 1, wherein $0.3<CT4/(T34+T45)<0.8$, where CT4 is a center thickness along the optical axis of the fourth lens, T34 is a spaced interval along the optical axis between the third lens and the fourth lens, and T45 is a spaced interval along the optical axis between the fourth lens and the fifth lens.

14. The optical imaging lens assembly according to claim 1, wherein $0.5<SAG41/SAG42<1.0$, where SAG41 is a distance along the optical axis from an intersection of an object-side surface of the fourth lens and the optical axis to a vertex of an effective radius of the object-side surface of the fourth lens, and SAG42 is a distance along the optical axis from an intersection of an image-side surface of the fourth lens and the optical axis to a vertex of an effective radius of the image-side surface of the fourth lens.

15. The optical imaging lens assembly according to claim 1, wherein $0.2<SAG32/SAG52<0.6$, where SAG32 is a distance along the optical axis from an intersection of an image-side surface of the third lens and the optical axis to a vertex of an effective radius of the image-side surface of the third lens, and SAG52 is a distance along the optical axis from an intersection of the image-side surface of the fifth lens and the optical axis to a vertex of an effective radius of the image-side surface of the fifth lens.

16. An optical imaging lens assembly, comprising sequentially from an object side to an image side along an optical axis:
    a first lens, having positive refractive power and a convex object-side surface;
    a second lens, having refractive power, and a concave image-side surface;
    a third lens, having refractive power;
    a fourth lens, having refractive power; and
    a fifth lens, having negative refractive power, a concave object-side surface, and a concave image-side surface,
wherein $TTL/ImgH<1.35$, and $$0.2<T23/DT22<0.6,$$

where TTL is a distance along the optical axis from the object-side surface of the first lens to an imaging plane of the optical imaging lens assembly, ImgH is half of a diagonal length of an effective pixel area on the imaging plane of the optical imaging lens assembly, DT22 is a maximum effective radius of the image-side surface of the second lens, and T23 is a spaced interval along the optical axis between the second lens and the third lens.

17. The optical imaging lens assembly according to claim 16, wherein $0.2<f2/f45<0.8$, where f2 is an effective focal length of the second lens, and f45 is a combined focal length of the fourth lens and the fifth lens.

18. The optical imaging lens assembly according to claim 16, wherein $0.5<f/f123<1.5$ where f is a total effective focal length of the optical imaging lens assembly, and f123 is a combined focal length of the first lens, the second lens, the third lens.

19. The optical imaging lens assembly according to claim 16, wherein $0.5<f1/f<1.5$, where f is a total effective focal length of the optical imaging lens assembly, and f1 is an effective focal length of the first lens.

20. The optical imaging lens assembly according to claim 16, wherein $0.5<f4/(f4-f5)<1.0$, where f4 is an effective focal length of the fourth lens and f5 is an effective focal length of the fifth lens.

* * * * *